(12) United States Patent
Kanzaki

(10) Patent No.: US 6,236,665 B1
(45) Date of Patent: *May 22, 2001

(54) TRANSMISSION DEVICE

(75) Inventor: Tomoyuki Kanzaki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,556

(22) Filed: Dec. 2, 1997

(30) Foreign Application Priority Data

Mar. 17, 1997 (JP) .................................................... 9-063207

(51) Int. Cl.$^7$ ........................................................ H04J 3/06
(52) U.S. Cl. ............................................ 370/503; 375/354
(58) Field of Search .................................. 370/503, 509, 370/516, 518; 375/226, 293, 354

(56) References Cited

U.S. PATENT DOCUMENTS

| | | | |
|---|---|---|---|
| 5,052,031 | * | 9/1991 | Molloy ................................. 375/376 |
| 5,473,274 | * | 12/1995 | Reilly et al. ........................ 327/159 |
| 5,512,860 | * | 4/1996 | Huscroft et al. ..................... 331/1 A |
| 5,535,251 | * | 7/1996 | Sugawara .............................. 375/356 |
| 5,754,607 | * | 5/1998 | Powell et al. ........................ 375/373 |
| 5,761,242 | * | 6/1998 | Thomas ................................. 375/226 |
| 5,793,822 | * | 7/1998 | Anderson et al. .................... 375/371 |
| 5,796,795 | * | 7/1998 | Mussman et al. .................... 375/372 |
| 5,828,670 | * | 10/1998 | Narasimha et al. ................. 370/516 |
| 5,850,387 | * | 12/1998 | Lyon et al. ........................... 370/250 |
| 6,041,066 | * | 3/2000 | Meki et al. ........................... 370/512 |

* cited by examiner

*Primary Examiner*—Hassan Kizou
*Assistant Examiner*—Ahmed Elallam
(74) *Attorney, Agent, or Firm*—Helfgott & Karas, P.C.

(57) ABSTRACT

A transmission device includes a first unit which selects one of clock signals in accordance with a given reference, the transmission device operating by using the above one of the clock signals, and a second unit which generates, when receiving a clock signal which is not supported by the given reference, a pseudo-reference which causes the first unit to be capable of selecting the received clock signal.

6 Claims, 28 Drawing Sheets

FIG. 4A PRIOR ART

| | Framing<br>A1 | Framing<br>A2 | STS-ID<br>C1 |
|---|---|---|---|
| Section overhead | BIP-8<br>B1 | Orderwire<br>E1 | User<br>F1 |
| | Data Com<br>D1 | Data Com<br>D2 | Data Com<br>D3 |
| Line overhead | Pointer<br>H1 | Pointer<br>H2 | Pointer action<br>H3 |
| | BIP-8<br>B2 | APS<br>K1 | APS<br>K2 |
| | Data Com<br>D4 | Data Com<br>D5 | Data Com<br>D6 |
| | Data Com<br>D7 | Data Com<br>D8 | Data Com<br>D9 |
| | Data Com<br>D10 | Data Com<br>D11 | Data Com<br>D12 |
| | Sync Status/<br>Growth<br>S1/Z1 | FEBE/Growth<br>M0 or M1/Z2 | Orderwire<br>E2 |

FIG. 4B PRIOR ART

| Trace<br>J1 |
|---|
| BIP-8<br>B3 |
| Signal label<br>C2 |
| Path status<br>G1 |
| User<br>F2 |
| Multiframe<br>H4 |
| Growth<br>Z3 |
| Growth<br>Z4 |
| Growth<br>Z5 |

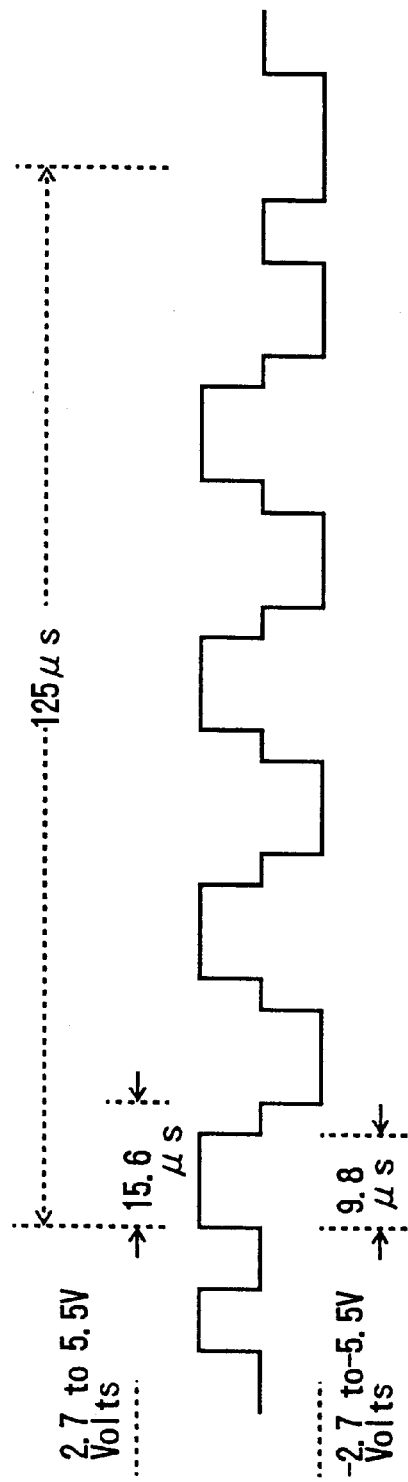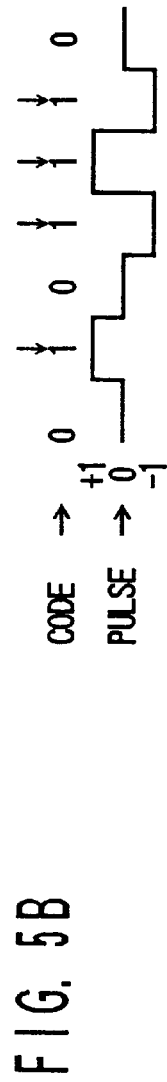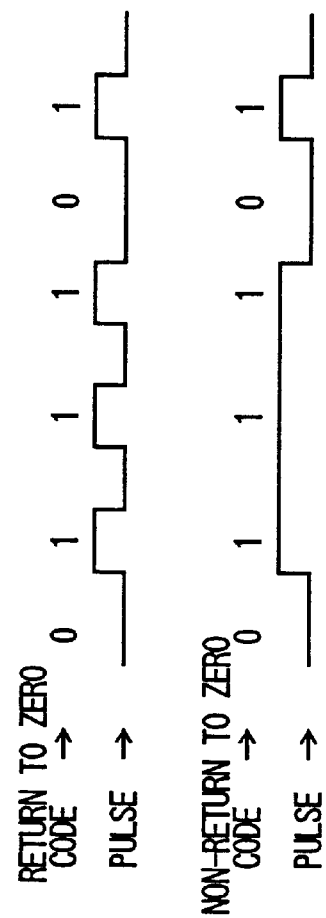

FIG. 8

| NAME | ABBR. | CONTENTS | PRIORITY | DS1 ESF DataLink | S1 |
|---|---|---|---|---|---|
| Stratum 1 Traceable | PRS | CLOCK PRECISION OF $\pm 10^{-11}$ | 1 | 00001000111111111 | 0001 |
| Synchronized-Traceability Unknown | STU | PRECISION INDEFINITE (USED FOR DEVICE THAT IS NOT SUPPORTED BY SYNC. MESSAGE) | 2 | 00001000111111111 | 0000 |
| Stratum 2 Traceable Holdover | ST2 | CLOCK PRECISION OF $\pm 1.6 \times 10^{-8}$ | 3 | 00001100111111111 | 0111 |
| Stratum 3 Traceable Holdover | ST3 | CLOCK PRECISION OF $\pm 4.6 \times 10^{-6}$ | 4 | 00010000111111111 | 1010 |
| Traceable SONET Clock Self Timed | SIC | CLOCK PRECISION OF $\pm 20 \times 10^{-6}$ | 5 | 00100010111111111 | 1100 |
| Traceable Stratum 4 Free-Run | ST4 | CLOCK PRECISION OF $\pm 32 \times 10^{-6}$ | 6 | 00101000111111111 | — |
| Don't Use for Sync | DUS | INHIBITED FROM BEING USED AS REF. CLOCK | 7 | 00110000111111111 | 1111 |
| Reserved for Network Synchronization Use | RES | — | User Assign | 01000000111111111 | 1110 |

F I G. 9
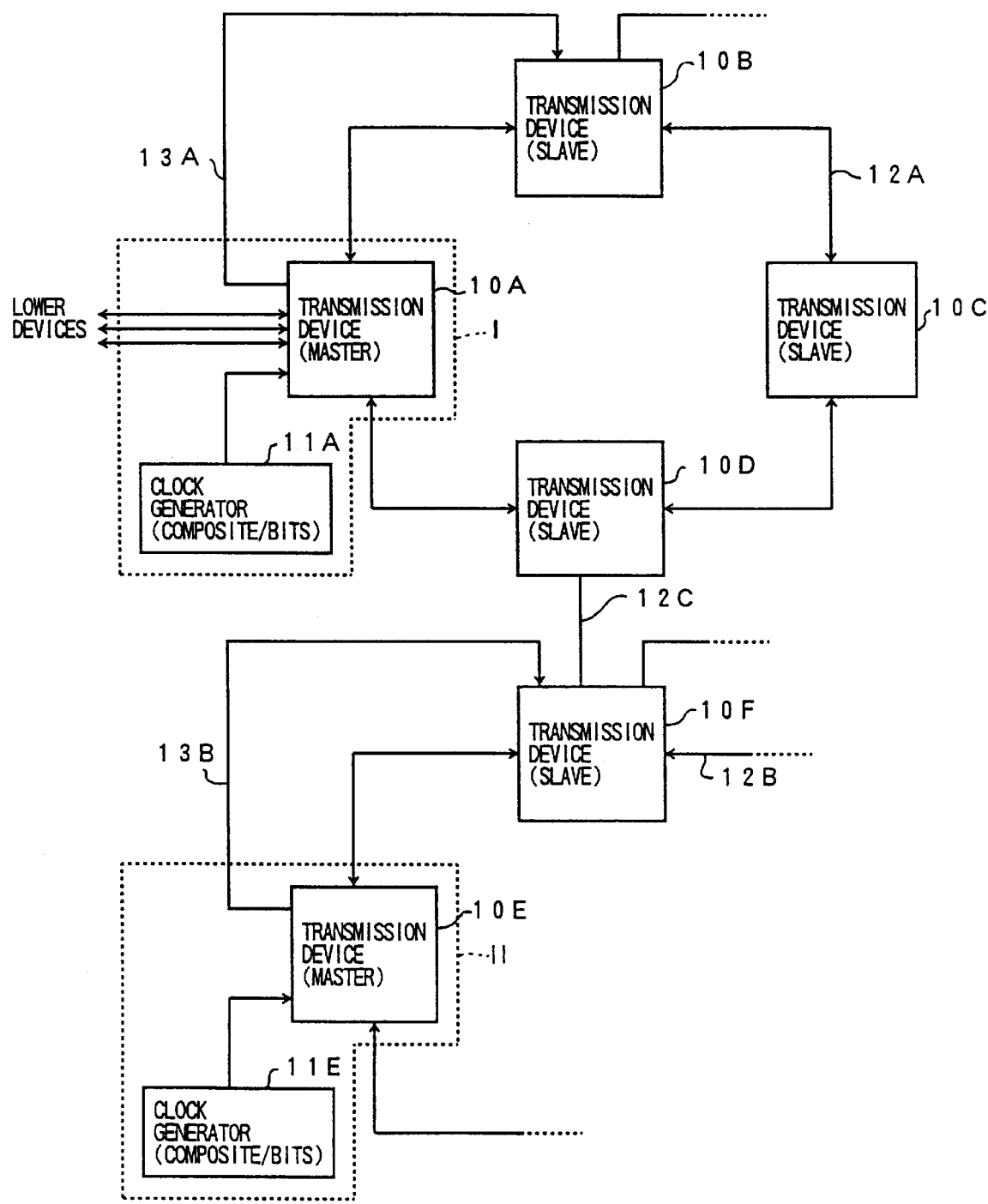

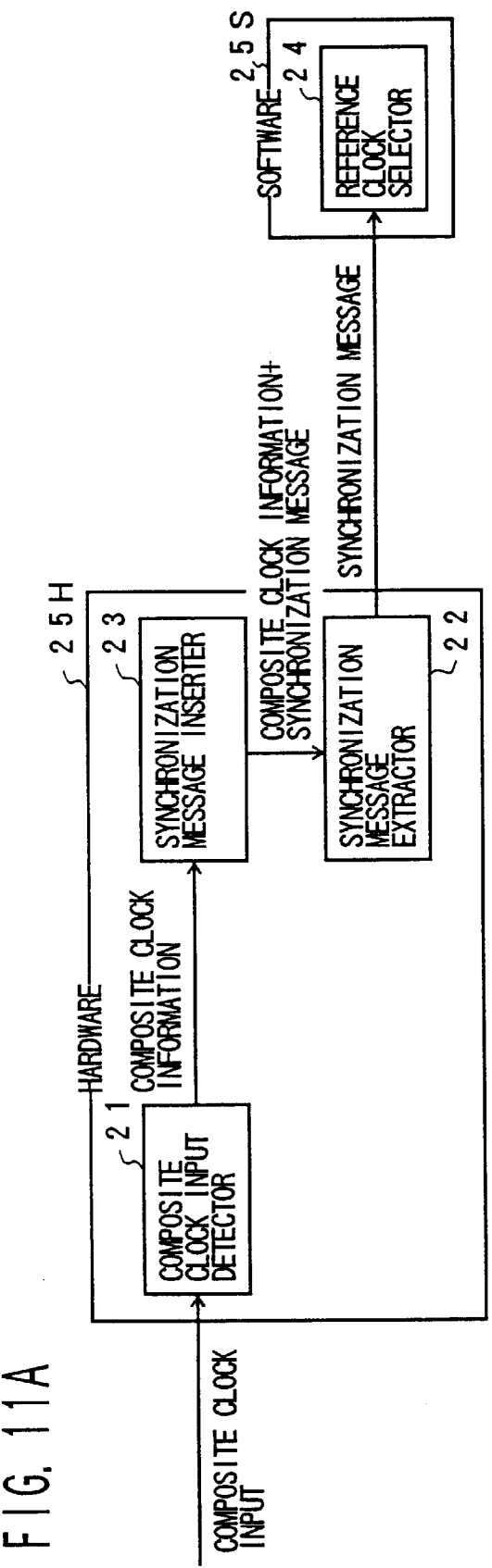
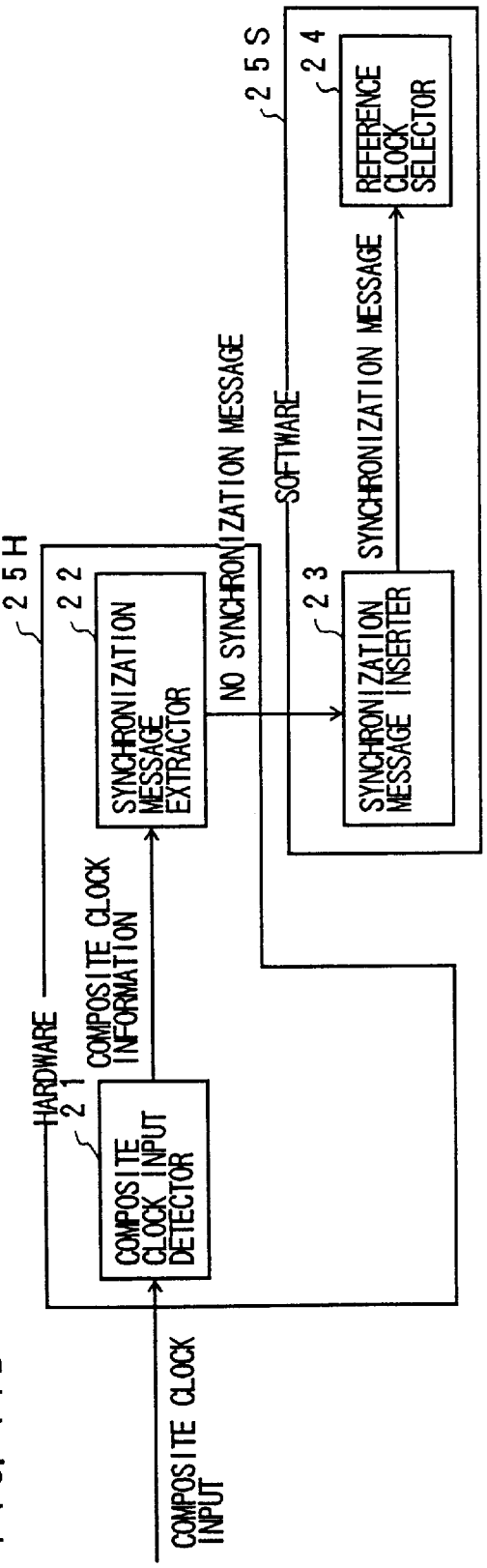
FIG. 11A
FIG. 11B

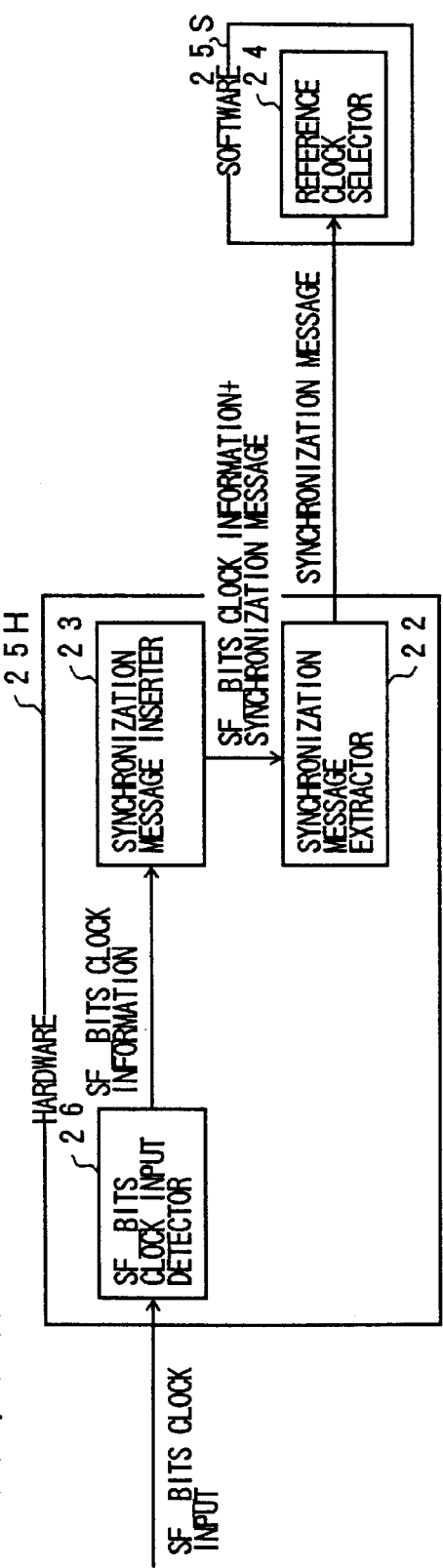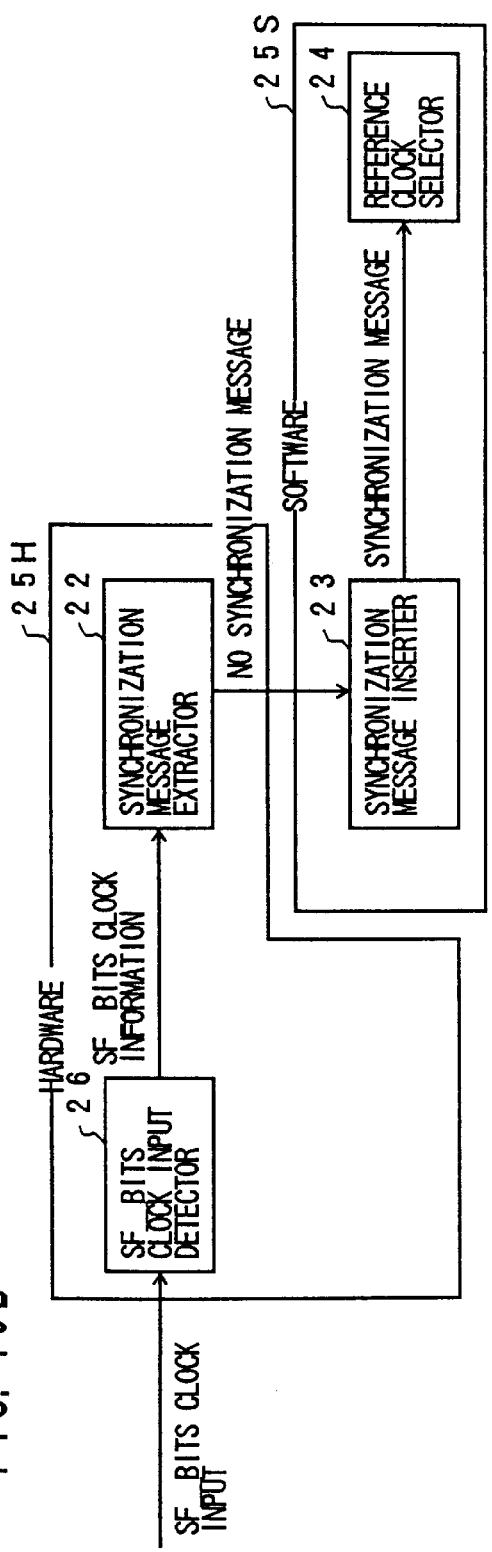
F I G. 13A
F I G. 13B

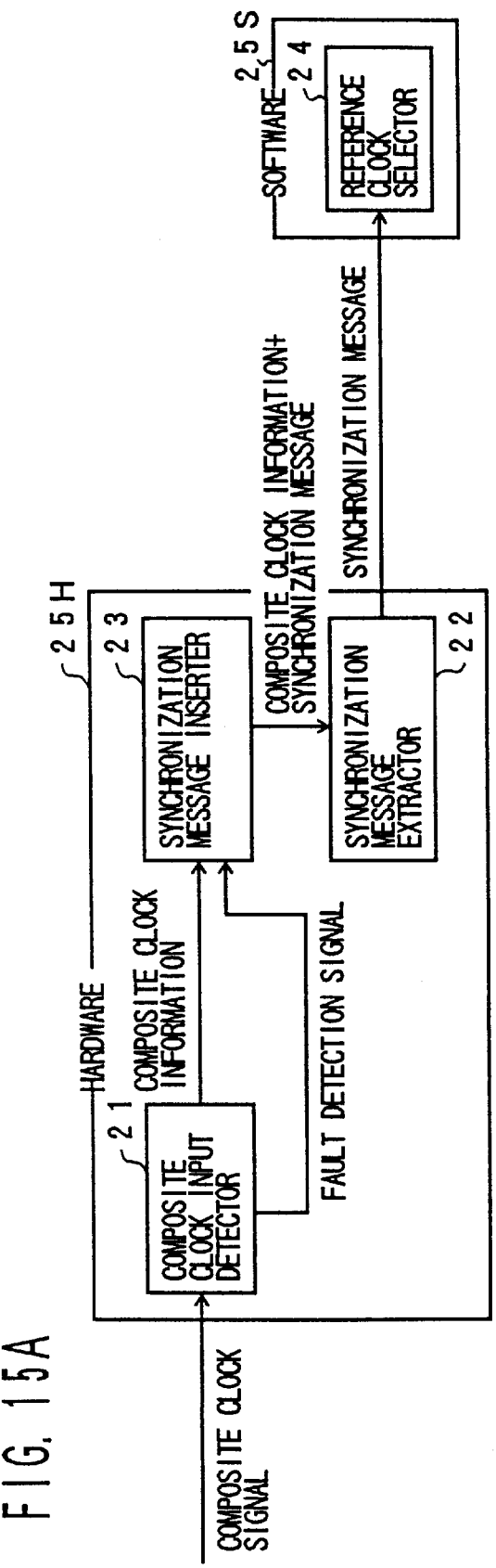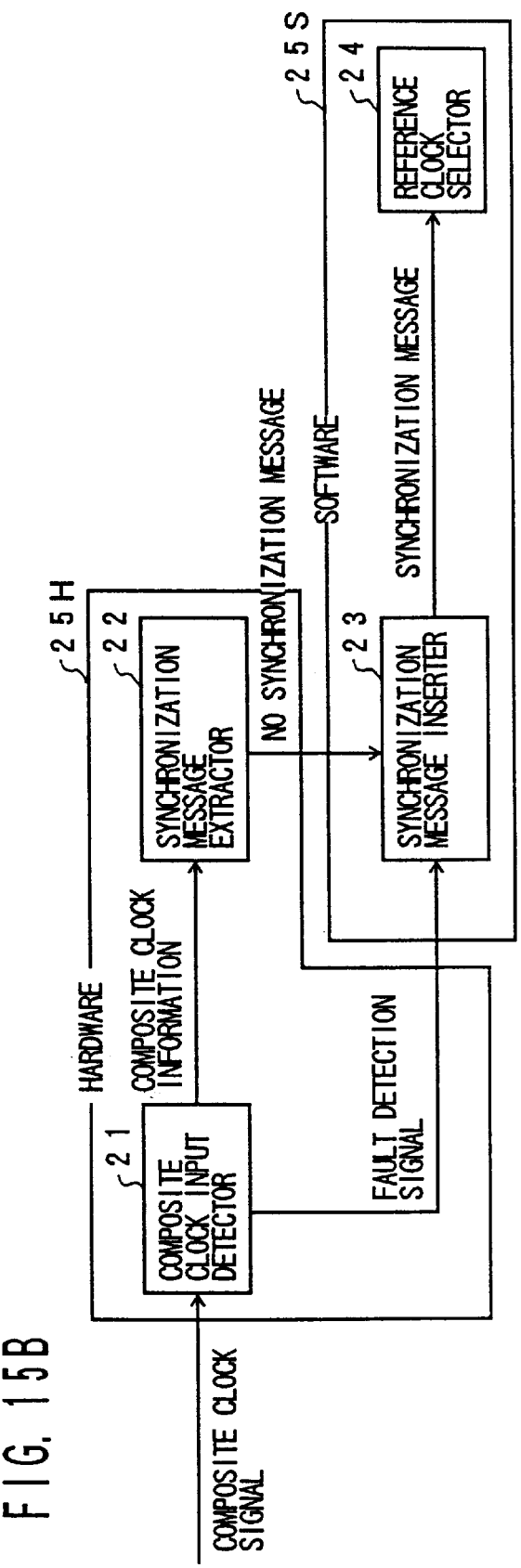

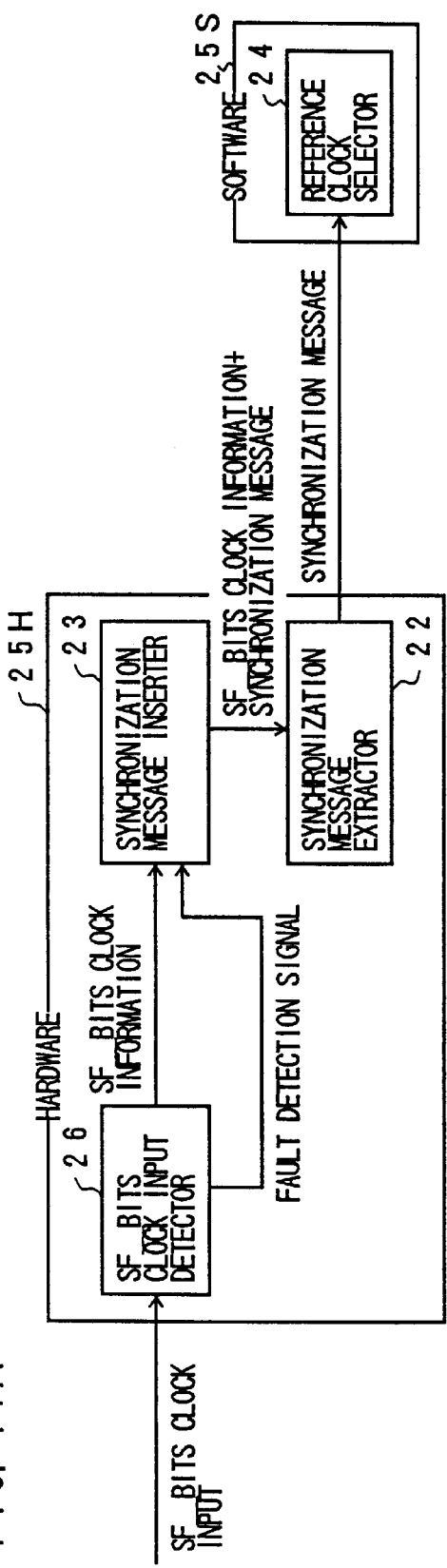
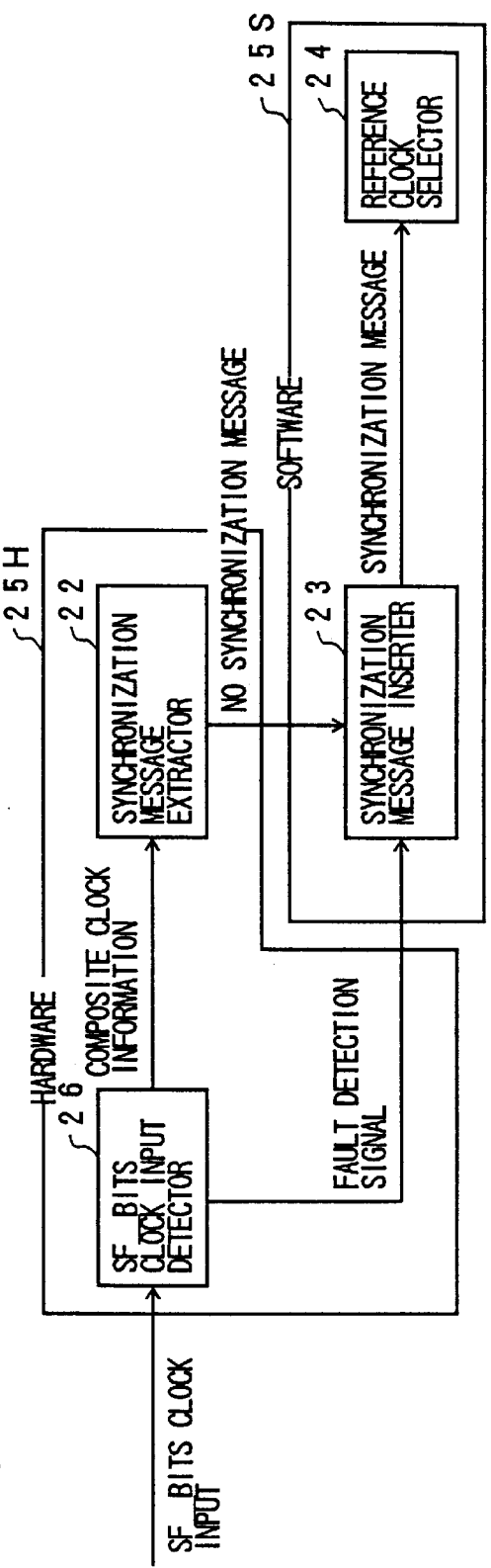
FIG. 17A
FIG. 17B

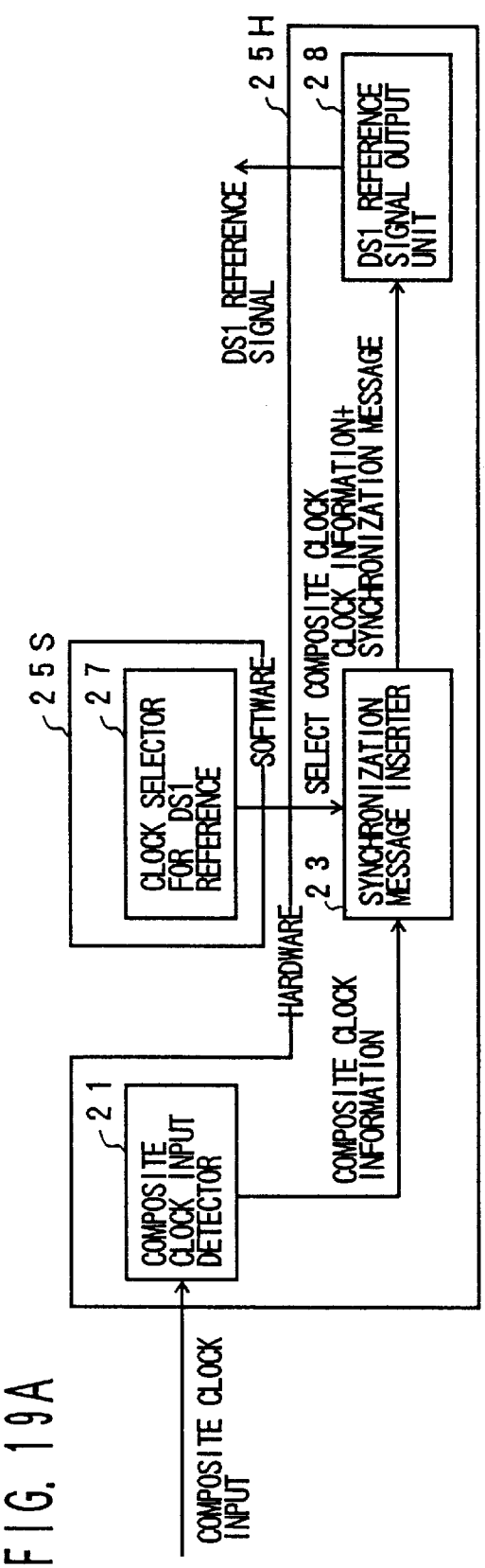
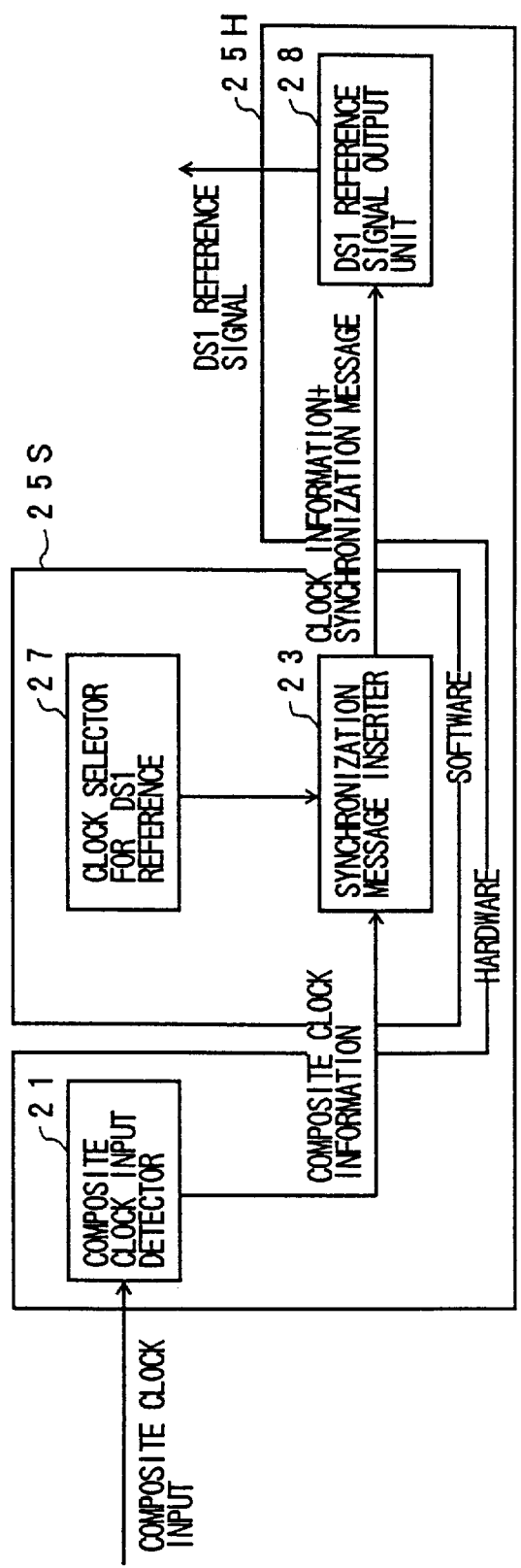
FIG. 19A
FIG. 19B

TRANSMISSION DEVICE

BACKGROUND OF THE INVENTION

1. Field of the Invention

The present invention generally relates to a transmission device connected to a network, and more particularly to a transmission device used for an optical communication network which employs a digital hierarchy.

An optical communication network has been practically used as means for providing broadband services in which a variety of data on telephone, facsimile, images and so on is integrated. The user/network interface in the optical communication network has been internationally standardized, and is known as a Synchronous Digital Hierarchy (SDH), as defined in the CCITT recommendations G707, G708 and G709, the disclosure of which is hereby incorporated by reference. A network which conforms to the SDH has been practically used as SONET (Synchronous Optical NETwork) in the North America.

2. Description of the Prior Art

First, a description will be briefly given of the SONET. The SONET is described in, for example, William Stallings, "ISDN and Broadband ISDN, Macmillan Publishing Company, 1992, pp. 546–558.

In the SONET, a multiplexed optical carrier (OC) is transmitted. The transmission device converts the optical signal (carrier) into an electric signal and vice versa. The electric signal is called a synchronous transport signal (STS). The basic bit rate of the SONET is 51.84 Mbps. The optical carrier having the above basic bit rate is expressed as OC-1. Generally, an optical carrier or signal is expressed as OC-N where N (optical carrier level N) is an integer, and a corresponding electric signal is expressed as STS-N (synchronous transport carrier level N). For example, the optical carrier OC-12 is an optical carrier or signal having a bit rate of 622.080 Mbps (=12×51.84 Mbps). In the SONET, signals having bit rates which are integer multiples of the basic bit rate. The optical carrier OC-12 is obtained by multiplexing 12 STS-1 signals at the byte level to thereby generate an STS-12 signal and by converting the STS-12 signal into an optical signal. Generally, the multiplexing of STS-N signals employs a byte-level interleave process.

It will be noted that the STS-3 in the SONET corresponds to a synchronous transport module STM-1 in the SDH. Similarly, the STS-12 corresponds to the STM-4.

As shown in FIG. 1, the signal STS can be obtained by, for example, sequentially multiplexing digital signals having lower bit rates, such as DS-0 (64 Kbps), DS-1 (1.5 Mbps), DS-2 (6.3 Mbps) and DS-3 (45 Mbps).

FIG. 2 is a block diagram showing the outline of a network of the SONET. Electric signals from terminals 1 and 2 are respectively multiplexed by transmission devices 3 and 7, and resultant multiplexed signals are converted into light signals, which are then sent to transmission paths 8 formed of optical fiber cables. Repeaters 4, 5 and 6 are provided in the transmission paths 8. Particularly, the repeater 5 has a function of terminating the optical signals (the above function is called an add/drop function). As shown in FIG. 2, terms "section", "line" and "path" are defined in the SONET. The section corresponds to an optical transmission part between transmission devices, between repeaters or between a transmission device and a repeater. The line corresponds to an optical transmission part between transmission devices, between repeaters or between a transmission device and a repeater, each having the terminating function. The path indicates the end-to-end optical transmission part.

FIG. 3A is a diagram showing the frame format of the signal STS-1. As shown in FIG. 3A, the signal STS-1 consists of 810 octets, and is transferred every 125 μs. The 810 octets consists of nine rows arranged in a matrix formation, each of the rows consisting of 90 octets. In other words, the signal STS-1 has a 9×9 matrix formation. The first three columns (three octets×nine rows) forms an overhead in which a variety of control information concerning transmissions. The first three rows of the overhead forms a section overhead, and the remaining six rows forms a line overhead. The control information forming the overheads is also referred to as overhead information.

FIG. 3B is a diagram showing the frame format of the signal STS-3. In the SDH, a new format is not created during the hierarchically multiplexing operation. That is, the signal STS-3 can be formed by simply byte-multiplexing the signals STS-1 including the headers thereof without forming a new header specifically directed to the signal STS-3.

FIG. 4A shows the section overhead and the line overhead, and FIG. 4B shows the path overhead. The bytes forming these overheads are well known, and a description thereof will be omitted here.

Generally, the B-ISDN employs a plurality of different clock signals, and each terminal in the B-ISDN uses any of the clock signals. For example, a composite clock signal is used for the DS-0 signal of the 64 kbps. The composite clock signal will be described with reference to FIGS. 5A through 5D.

The composite clock signal is composed of a BPV pulse signal of 64 kbps and a return-to-zero pulse signal of 8 kbps (hereinafter simply referred to as RZ pulse signal). As shown in FIG. 5A, the RZ pulse is superimposed on the BPV pulse signal every eight pulses. As shown in FIG. 5B, the BPV pulse signal alternately converts code "1" into "+1" and "−1". As shown in FIG. 5C, the RZ pulse signal switches has a section "0" for each code. A non-return-to-zero pulse signal is shown in FIG. 5D for reference.

Another clock signal called SF_BITS is used for the DS-1 signal of 1.544 Mbps. The transmission device which processes the DS-1 signal operates in synchronism with the SF_BITS clock signal.

Yet another clock signal called line clock is used for the signal DS-3 (which corresponds to the signal STS-1) and the signal STS-3.

Conventionally, each terminal in the B-ISDN uses the predetermined clock signal as a reference clock. Recently, an arrangement has been proposed in which the clock to be used can be selected by using a synchronization message. The synchronization message is defined in the SONET standard, and indicates the quality level of the reference clock (the precision of the clock). The synchronization message is sometimes called QL information. The synchronization message is transferred between the terminals by means of the given overhead and an ESF_DS1 data link which will be described later. One of the clock signals having the highest quality indicated in the synchronization message is selected as the reference clock or master clock.

Two frame formats of the signal DS-1 have been defined in the SONET standard, one of which is an SF (Super Frame) format and the other is an ESF (Extended Super Frame) format.

FIG. 6 is a diagram of the SF format. One super frame SF consists of 12 frames. Each of the 12 frames in the SF format is made up of 24 time slots (1–24) and a frame bit F. One time slot consists of eight bits. One frame is equal to 125 μs, and one multiframe is equal to 1.5 ms. The 12 frame bits F included in the multiframe of the SF format form a synchronizing signal.

FIG. 7 is a diagram of the ESF format. One extended super frame ESF consists of 24 frames. Each of the 24 frames in the ESF format is made up of 24 time slots and a frame bit F. One time slot consists of eight bits. One frame is equal to 125 µs, and one multiframe is equal to 3.0 ms. The 24 frame bits F included in the multiframe of the ESF format include six bits used to form the synchronizing signal, four bits for CRC channels, and 12 bits used to form a data link signal.

The data link signal composed of the above 12 bits is used to transfer the synchronization message indicative of the qualities of the clock signals.

FIG. 8 shows the relationship between the qualities of the clock signals and the data link signal. FIG. 8 shows five different clock qualities, and shows the corresponding values of the data link signal and the corresponding values of the S1 byte (FIG. 4A). The synchronization message is allowed to indicate indefinite clock precision and inhabitation of use for the reference clock.

The transmission device which is operating in a clock selection mode selects the reference clock by referring to the synchronization message received by the transmission device. The transmission device which sends the synchronization message selects the clock signal having the highest clock quality and specifies the corresponding clock quality information therein.

As shown in FIG. 8, the lowest precision (quality) supported by the synchronization message is equal to $\pm 4.6 \times 10^{-6}$. The lowest precision is much higher than the possible highest quality of the composite clock signal or the SF_BITS clock signal. In other words, the synchronization message does not support the composite clock signal and the SF_BITS clock signal. Hence, the transmission device which is operating in the clock selection mode using the synchronization message cannot select, as the reference clock signal, the composite clock signal or the SF_BITS clock signal. In addition, the above transmission device cannot notify the other transmission devices of use of the composite clock signal or the SF_BITS clock signal as the reference clock signal.

If a certain factor occurs which prevents the transmission device from selecting the reference clock signal based on the synchronization message, the transmission device no longer operates. Further, the other transmission devices which are notified of the reference clock signal do not operate. Even if these transmission devices receive the composite clock signal or the SF_BITS clock signal, the devices do not select any of the clock signals as the reference clock. As a result, the services related to the transmission devices become not available.

SUMMARY OF THE INVENTION

It is a general object of the present invention to provide a novel and useful transmission device in which the above disadvantages are eliminated.

A more specific object of the present invention is to provide a transmission device which can select, as the reference clock signal, a clock signal which is not supported by a message which specifies the clock signal to be selected as the reference clock.

The above objects of the present invention are achieved by a transmission device comprising: a first unit which selects one of clock signals in accordance with a given reference, the transmission device operating by using the above one of the clock signals; and a second unit which generates, when receiving a clock signal which is not supported by the given reference, a pseudo-reference which causes the first unit to be capable of selecting the received clock signal.

The transmission device may further comprise a third unit which determines whether a fault occurs in the received clock signal and prevents the first unit from selecting the received clock signal.

The transmission device may further comprise a third unit which transfers the received clock signal and the pseudo-reference to another transmission device, which can select the received clock signal by referring to the pseudo-reference.

The transmission device may further comprise a fourth unit which determines whether a fault occurs in the received clock signal and prevents the first unit from selecting the received clock signal.

The above transmission device may be configured so that: the predetermined reference includes information concerning qualities of the clock signals; and the pseudo-reference includes information concerning a pseudo-quality of the clock signal which is not supported by the predetermined reference.

The above transmission device may be configured so that: the predetermined reference includes a synchronization message defined in the SONET; and the clock signal which is not supported by the predetermined reference is a clock signal at a DS-0 or DS-1 level.

BRIEF DESCRIPTION OF THE DRAWINGS

Other objects, features and advantages of the present invention will become more apparent from the following detailed description when read in conjunction with the accompanying drawings, in which:

FIG. 4A is a diagram of a section overhead;

FIG. 4B is a diagram of a path overhead;

FIGS. 5A, 5B, 5C and 5D are waveform diagrams explaining a composite clock signal;

FIG. 8 is a diagram of a synchronization message;

FIG. 9 is a block diagram of a network to which the present invention is applied;

FIG. 11A is a block diagram of a first combination of hardware and software for realizing the first embodiment of the present invention;

FIG. 11B is a block diagram of a second combination of hardware and software for realizing the first embodiment of the present invention;

FIG. 13A is a block diagram of a first combination of hardware and software for realizing the second embodiment of the present invention;

FIG. 13B is a block diagram of a second combination of hardware and software for realizing the second embodiment of the present invention;

FIG. 15A is a block diagram of a first combination of hardware and software for realizing the modification shown in FIG. 14;

FIG. 15B is a block diagram of a second combination of hardware and software for realizing the modification shown in FIG. 14;

FIG. 17A is a block diagram of a first combination of hardware and software for realizing the modification shown in FIG. 16;

FIG. 17B is a block diagram of a second combination of hardware and software for realizing the modification shown in FIG. 16;

FIG. 19A is a block diagram of a first combination of hardware and software for realizing the third embodiment of the present invention;

FIG. 19B is a block diagram of a second combination of hardware and software for realizing the third embodiment of the present invention;

DESCRIPTION OF THE PREFERRED EMBODIMENTS

Referring to FIG. 9, a description will be given of a network to which the present invention is applied. The network shown in FIG. 9 includes transmission devices 10A, 10B, 10C and 10D, which are bi-directionally connected in a ring formation by means of an optical transmission line 12A. The network includes transmission devices 10E and 10F, which are bi-directionally connected in a ring formation by means of an optical transmission line 12B. The transmission devices 10D and 10F are bi-directinally connected by an optical transmission line 12C. The transmission device 10A functions as a master device in the ring network including the transmission devices 10A–10D, and is located in a station I in which a clock generator 11A is provided. Similarly, the transmission device 10E functions as a master device in the ring network including the transmission devices 10E and 10F, and is located in a station II in which a clock generator 11E is provided. The transmission devices 10B–10D serve as slave devices.

The optical transmission lines 12A, 12B and 12C carry light signals defined in the SONET standard, such as the signals OC-3 and OC-12.

The transmission device 10A is connected to lower transmission devices (not shown) via optical or electric transmission lines. For example, if the transmission device 10A transmits the light signal OC-12 over the optical transmission line 12A, the lower transmission devices will process the light signals OC-3 or the electric signals STS-1. Lower transmission devices may be coupled to the other transmission devices. If the transmission device is a repeater device, no lower transmission device will be connected thereto.

Figure 1:
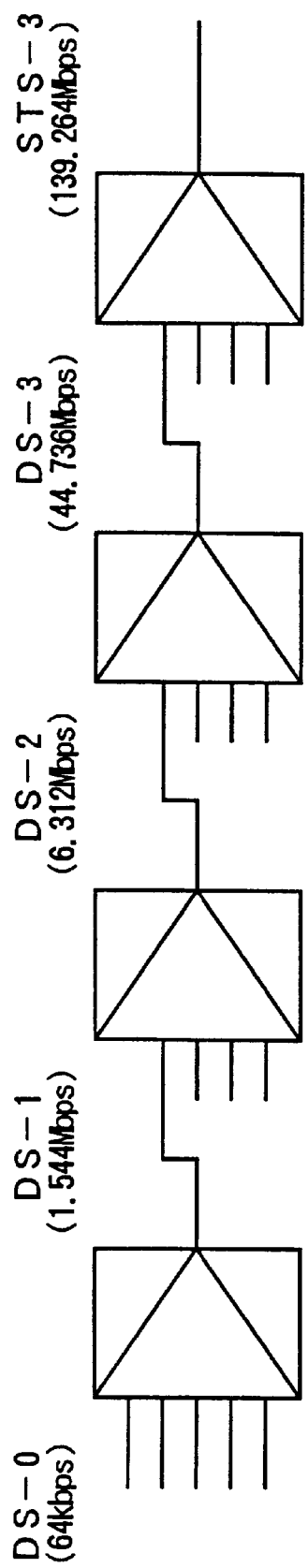
FIG. 1 is a block diagram of a digital hierarchy.
Figure 2:
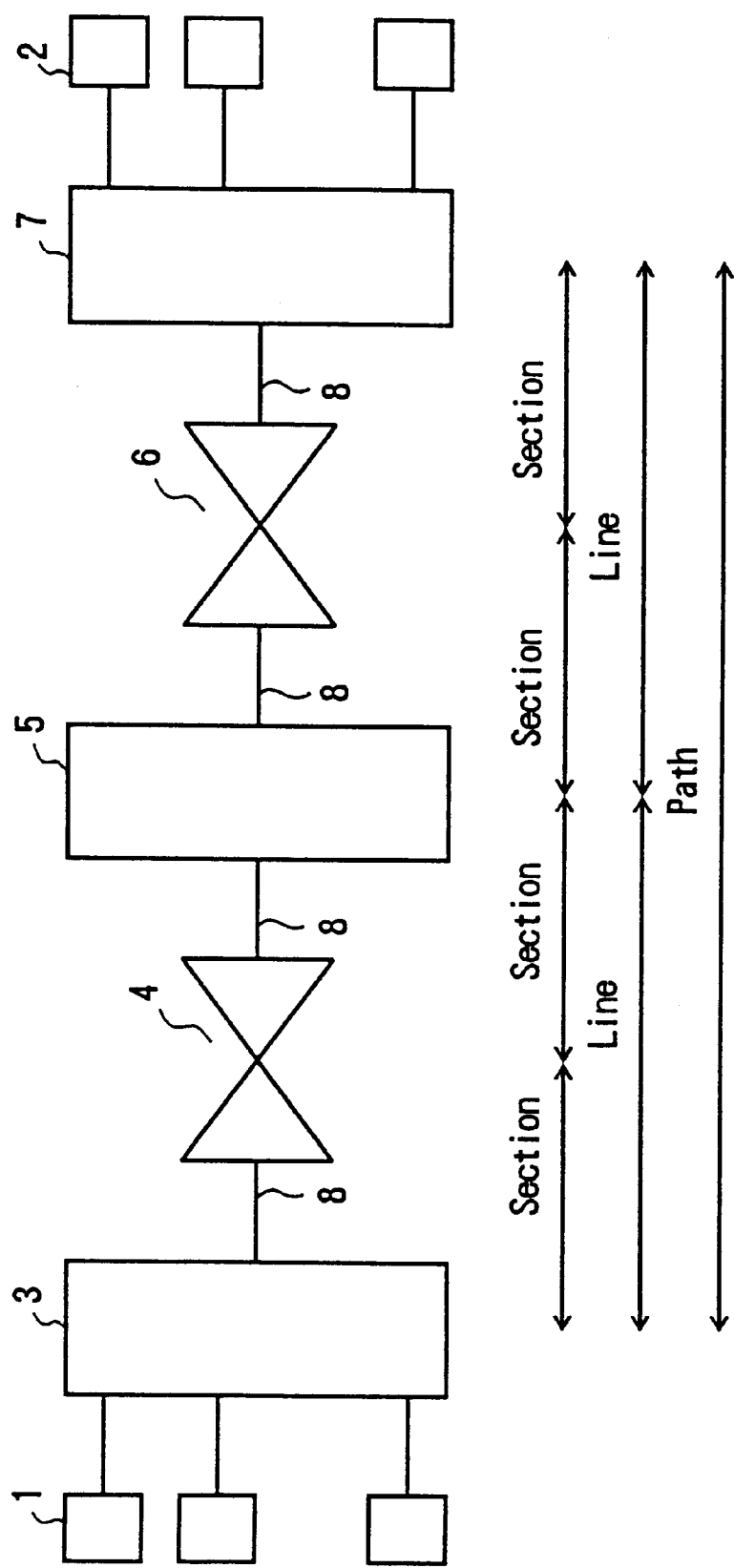
FIG. 2 is a block diagram of an example of the SONET.
Figures 3A, 3B:
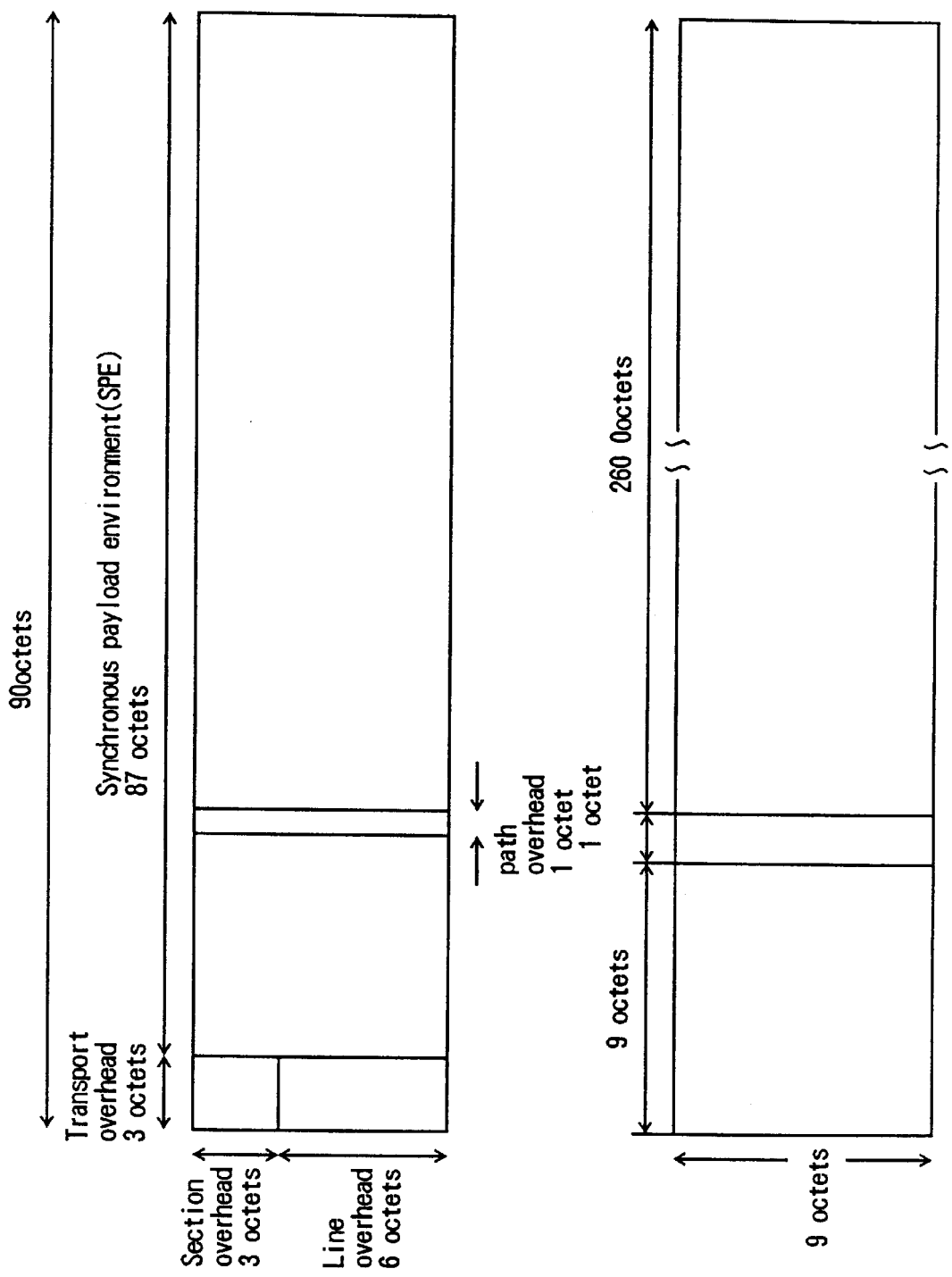
FIG. 3A is a diagram of an STS-1 signal format.
FIG. 3B is a diagram of an STS-3 signal format.
Figure 6:
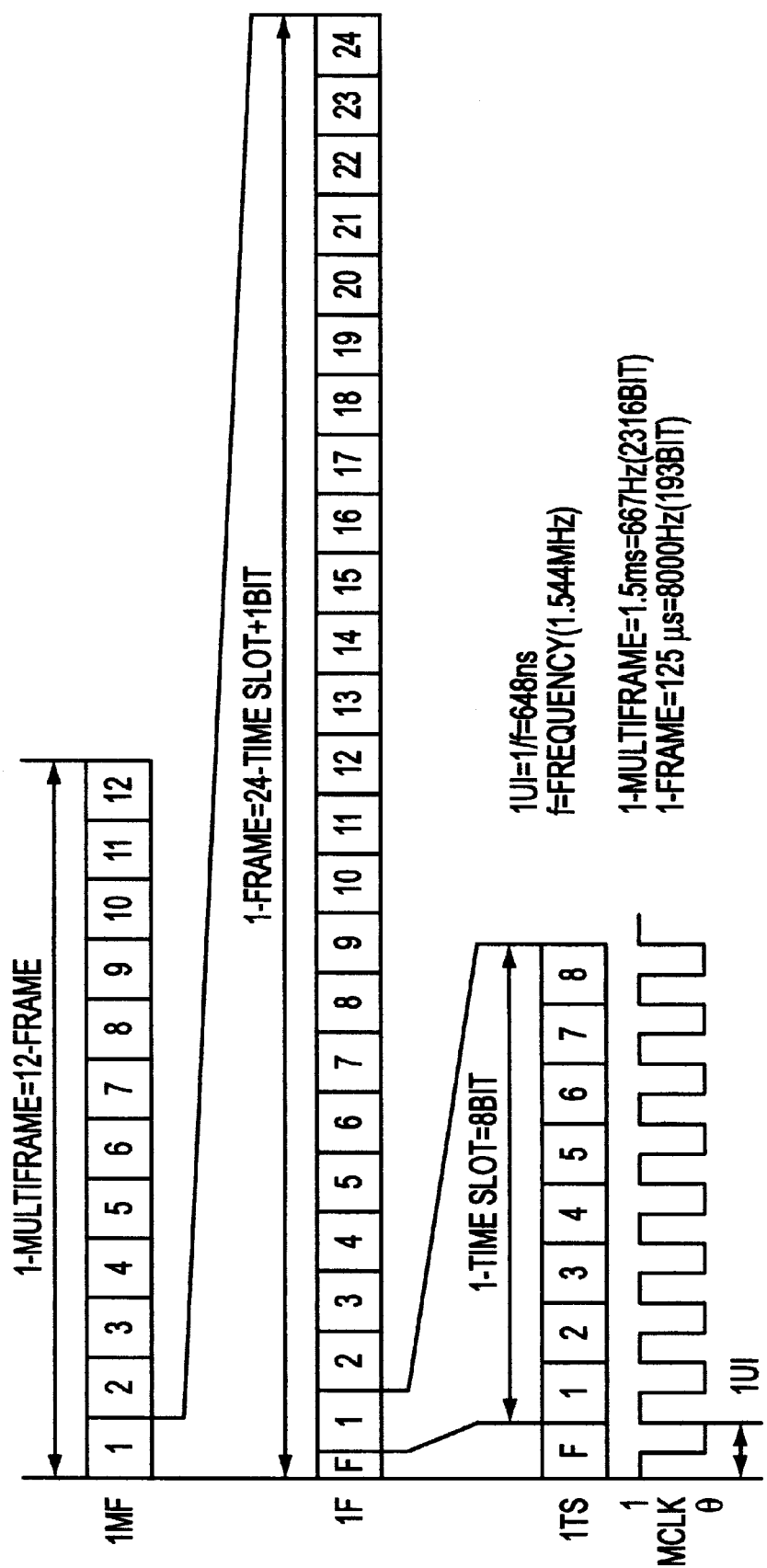
FIG. 6 is a diagram of a super frame format.
Figure 7:
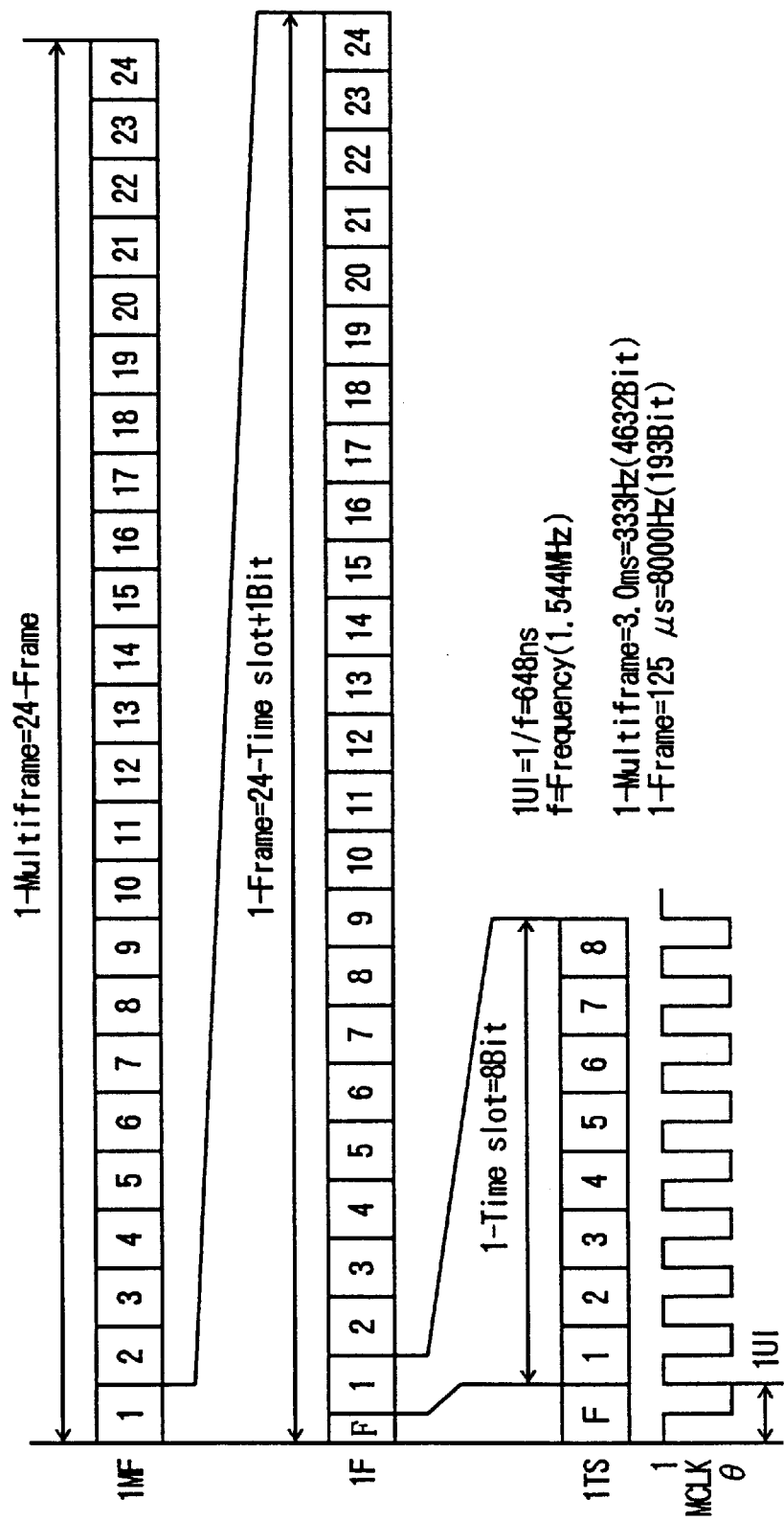
FIG. 7 is a diagram of an extended super frame format.

The clock generator 11A generates the composite clock signal and the SF_BITS clock signal, and outputs these clock signals to the transmission device 10A. The transmission device 10A has a circuit which produces the line clock signal from at least one of the clock signals from the clock generator 11A. The transmission device 10A can process the composite clock signal, the SF_BITS clock signal, the line clock signal generated therefrom and the line clock signal from another transmission device. The transmission device 10A inserts information concerning the selected clock signal (DS1 reference signal) into the ESF frame format shown in FIG. 7, and sends it to the transmission device 10B via an ESF_DS1 data link 13A. The selected clock signal is one of the composite clock signal, SF_BITS clock signal and the line clock signals. The clock information concerning the composite clock signal can be used to regenerate the clock signal therefrom. The ESF frame format in which the clock information is inserted includes the synchronization message shown in FIG. 8. In the above manner, the clock information (DS1 reference signal) and the synchronization message are transferred via the transmission devices 10B–10D.

The station II is configured in a way similar to that of the station I. The clock generator 11E of the station II generates the composite clock signal and the SF_BITS clock signal, and outputs these clock signals to the transmission device 10E. The transmission device 11E includes a circuit which produces the line clock signal from at least one of the clock signals from the clock generator 11E. The transmission device 10E can process the composite clock signal, the SF_BITS clock signal, the line clock signal generated therefrom and the line clock signal from another transmission device. The transmission device 10E inserts information concerning the selected clock signal (DS1 reference signal) into the ESF frame format shown in FIG. 7, and sends it to the transmission device 10F via an ESF_DS1 data line 13B. The selected clock signal is one of the composite clock signal, SF_BITS clock signal and the line clock signals. The clock information concerning the composite clock signal can be used to regenerate the clock signal therefrom. The ESF frame format in which the clock information is inserted includes the synchronization message shown in FIG. 8. In the above manner, the clock information (DS1 reference signal) and the synchronization message are transferred via the transmission device 10F and other devices (not shown) connected via the ESF_DS1 data link.

The transmission devices 10A through 10F can operate in the clock selection mode. That is, the transmission devices 10A through 10F refer to the S1 byte in the overhead of the light signal and the synchronization message received via the ESF_DS1 data links 13A and 13B, and uses the selected clock signal as the reference clock signal.

As has been described previously, the prior art cannot select, as the reference clock signal, the composite clock signal and the SF_BITS clock signal which are not supported by the synchronization message. In other words, one of the line clock signals having the composite clock signal and the SF_BITS clock signal is selected by the reference clock signal. For example, the transmission device 10A selects one of the line clock signals which are generated therein or are externally received from a lower transmission device by referring the quality of the line clock signal generated therein and the quality information indicated by the S1 byte in the synchronization message given for each line clock signal. The selected clock signal has the highest quality or precision. If a fault occurs by which the transmission device 10A cannot select any of the line clock signals, the transmission device 10A does not have any clock signal to be selected in the prior art. However, if the transmission device 10A is allowed to use the composite clock signal or the SF_BITS clock signal, the transmission device 10A will continue to operate. However, it is very difficult to ensure the perfect operation of the transmission device 10A because the composite clock signal or the SF_BITS clock signal does not have a quality as high as that of the line clock signals. In other words, the composite clock signal or the SF_BITS clock signal is capable of making it possible to continue to partially operate.

The present invention is directed to making the synchronization message support the composite clock signal and the SF_BITS clock signal in a pseudo-supporting formation (pseudo-reference for selection) in order to make it possible for the transmission device operating in the clock selection mode to select the composite clock signal or the SF_BITS clock signal. That is, the synchronization message indicates a pseudo-quality of the clock signal as if it is supported by the synchronization message.

Figure 10:
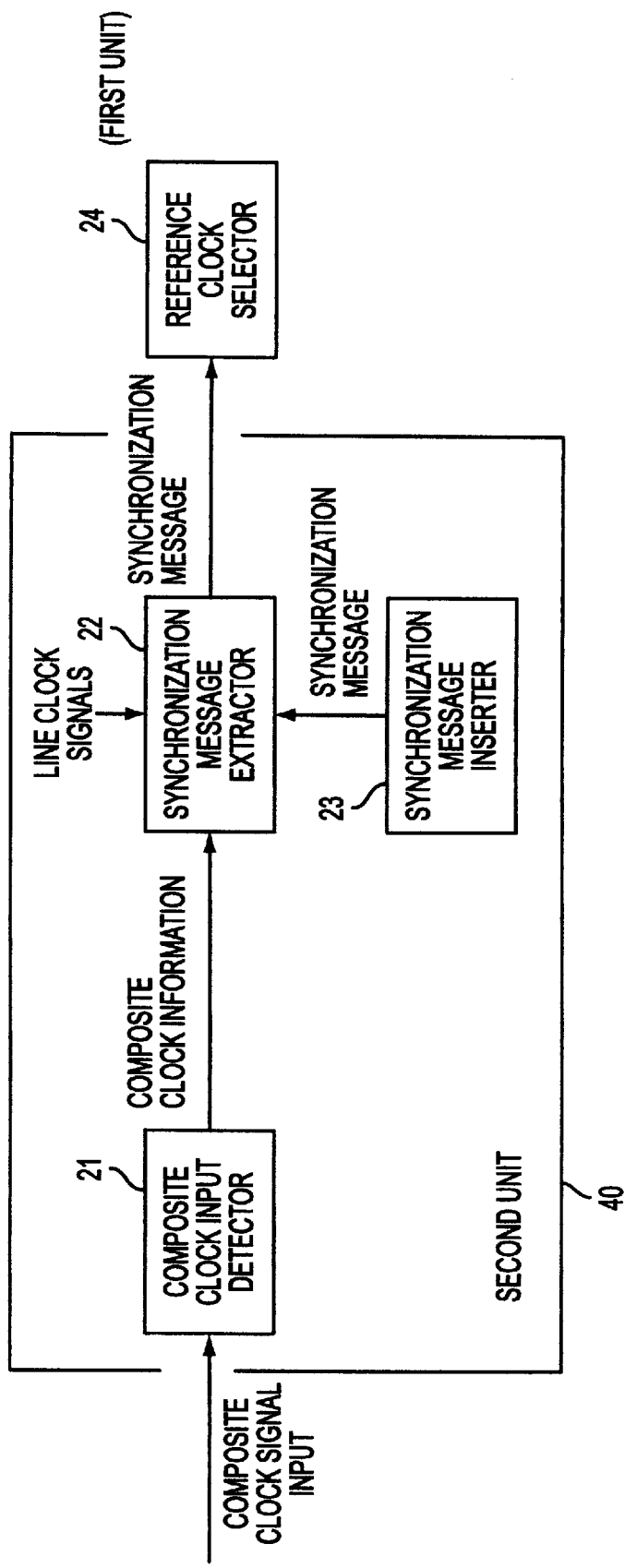
FIG. 10 is a block diagram of a first embodiment of the present invention.

FIG. 10 is a block diagram of a first embodiment of the present invention. The structure shown in FIG. 10 is provided in the transmission devices 10A and 10E. In the following description, the structure shown in FIG. 10 includes a first unit which is a reference clock selector 24 and a second unit 40 provided in the transmission device 10A.

The structure shown in FIG. 10 is directed to making it possible for the synchronization message to support the composite clock signal and the SF_BITS clock signal in the pseudo-supporting formation. The structure shown in FIG. 10 is made up of a composite clock input detector 21, a synchronization message extract unit 22, a synchronization message insert unit 23 included in unit 40 and the reference clock selector 24.

The composite clock input detector 21 detects the composite clock signal generated by the composite clock generated by the clock generator 11A shown in FIG. 9 or the composite clock signal from another transmission device. In practice, the composite clock input detector 21 detects the DS1 reference signal (clock information) for the composite clock signal. The synchronization message extractor 22 extracts (drops) the synchronization message from the S1 byte in the overhead of the received light signal or the clock information received via the ESF_DS1 data link 13A. The synchronization message inserter 23 generates a synchronization message including given clock quality information concerning the composite clock signal in order to make it possible to use, as the reference clock signal, the composite clock signal. For example, the given quality information can be formed by the STU indicating the predetermined constant value or a newly assumed constant value. When the composite clock signal is detected by the composite clock input detector 21, the synchronization message generated by the inserter 23 is output to the reference clock signal selector 24 via the extractor 22. The reference clock signal selector 24 selects one of the clock signals which has the highest precision (quality) by referring to the synchronization messages provided to the respective clock signals. It should be noted that the synchronization message is newly provided to the composite clock signal. Hence, the composite clock signal can be handled as a selectable clock signal as if it is the line clock signal.

The structure shown in FIG. 10 can be realized by a combination of hardware and software as shown in FIG. 11A or 11B. The structure shown in FIG. 11A is made up of a hardware block 25H and a software block 25S. The hardware block 25H includes the composite clock input detector 21, the synchronization message inserter 23 and the synchronization message extractor 22. The software block 25S includes the reference clock selector 24. The positional relationship between the extractor 22 and the inserter 23 shown in FIG. 11A is different from that shown in FIG. 10. However, in both FIGS. 10 and 11A, the synchronization message for the composite clock signal is generated in the same manner as each other. More particularly, in FIG. 11A, the clock information indicative of the composite clock signal is added to the synchronization message, which is sent to the reference clock signal selector 24 via the synchronization message extractor 22. The extractor 22 also extracts the other messages for the line clock signals.

Referring to FIG. 11B, the hardware block 25H includes the composite clock input detector 21 and the synchronization message extractor 22, and the software block 25S includes the synchronization message inserter 23 and the reference clock signal selector 24. When the extractor 22 receives the composite clock information from the detector 21, the extractor 22 notifies the inserter 23 that there no synchronization message. In response to this notification, the inserter 23 generates the synchronization message including the clock information concerning the composite clock signal, and sends it to the reference clock signal selector 24.

Figure 12:
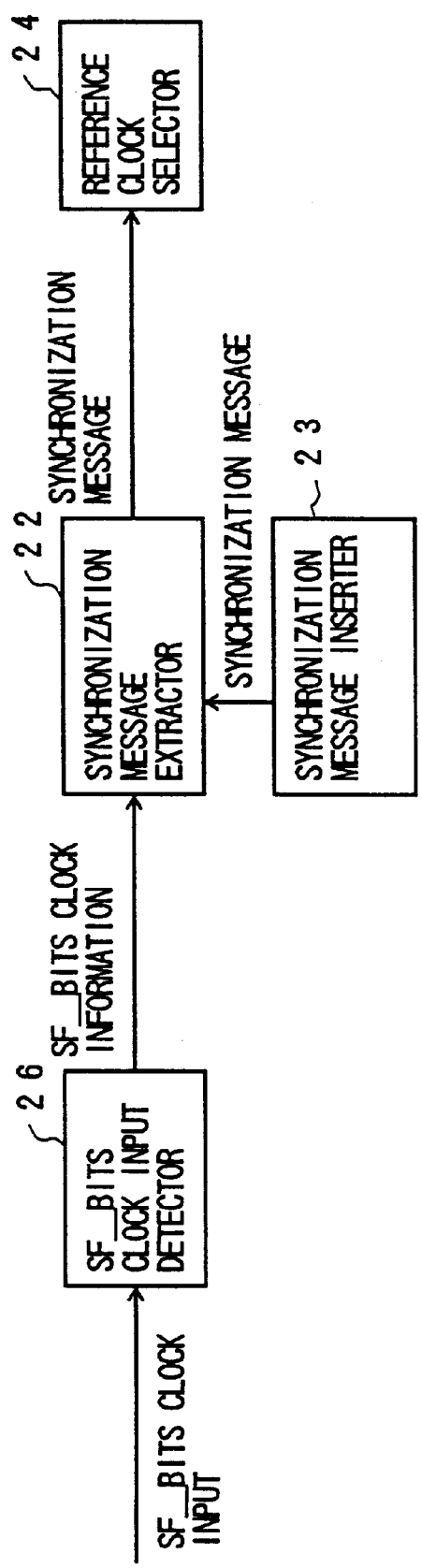
FIG. 12 is a block diagram of a second embodiment of the present invention.

FIG. 12 is a block diagram of a second embodiment of the present invention, in which parts that are shown in the previously described figures are given the same reference numbers. The second embodiment of the present invention is directed to generating the synchronization message for the SF_BITS clock signal. An SF_BITS clock signal detector 26, which is substituted for the composite clock signal detector 21, detects the SF_BITS clock signal. When the SF_BITS clock signal is detected, the synchronization message for the SF_BITS clock signal is generated by the inserter 23 and is transferred to the reference clock signal selector 24 via the synchronization message extractor 22. Thus, the selector 24 can select the SF_BITS clock signal as the reference signal. The synchronization message for the SF_BITS clock signal may be identical to different from that for the composite clock signal. For example, the STU shown in FIG. 8 can be commonly used to the SF_BITS clock signal and the composite clock signal. If the common synchronization message is used, the selector 24 can select either the SF_BITS clock signal or the composite clock signal. In this case, it is possible to define priority indicating the order of clock selection.

The structure shown in FIG. 12 can be realized by a combination of hardware and software as in the case of the first embodiment of the present invention. Referring to FIG. 13A, the hardware block 25H is made up of the detector 26, the inserter 23 and the extract 22 shown in FIG. 12. The software block 25S includes the selector 24. In FIG. 13B, the detector 26 and the extractor 22 are formed by 10 hardware, and the inserter 23 and the selector 24 are formed by software.

Figure 14:
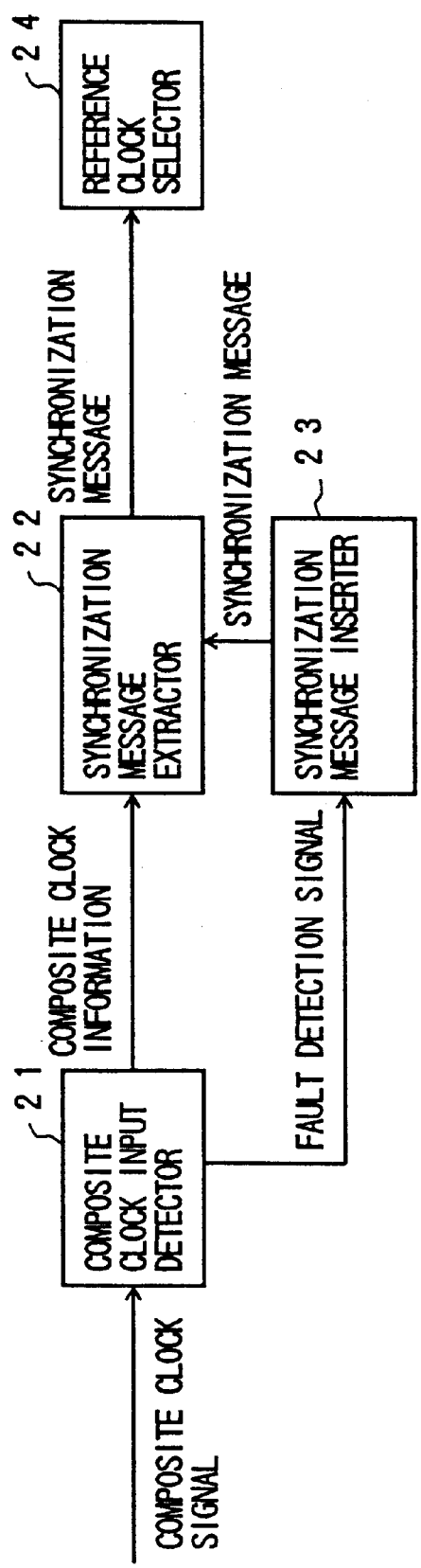
FIG. 14 is a block diagram of a modification of the first embodiment of the present invention.

FIG. 14 is a block diagram of a variation of the first embodiment of the present invention. The aforementioned first embodiment of the present invention employs the given clock quality information which assumes the constant value. Hence, there is a possibility that the above clock quality information may be continuously used even if a fault occurs in the inputting of the composite clock signal. The variation shown in FIG. 14 is directed to eliminating the above possibility.

The composite clock signal detector 21 shown in FIG. 14 detects the composite clock signal and a fault which occurs therein. For example, the detector 21 detects the following events as faults. If either the 8 kbps clock signal or the 64 kbps clock signal, both of which form the composite clock signal, is broken, the detector 21 determines that a fault occurs in the composite clock signal. If the frequency of the composite clock signal fluctuates, the detector 21 determines that a fault occurs in the composite clock signal. For example, the 8 kbps clock signal is checked every 8 kbps, and the 64 kbps clock signal is checked every 50 μs. When such a fault is detected, the detector 21 outputs a fault detection signal to the inserter 23. In response to the fault detection signal, the inserter 23 sends, via the extractor 22, the selector 24 clock quality information which indicates that the corresponding clock signal is inhibited from being used as the reference clock signal. Hence, the selector 24 is inhibited from selecting the composite clock signal.

The structure shown in FIG. 14 can be realized by a combination of hardware and software, as shown in FIG. 15A or FIG. 15B. In FIG. 15A, the detector 21, the extractor 22 and the inserter 23 are realized by hardware, and the selector 24 is realized by software. In FIG. 15B, the detector 21 and the extractor 22 are realized by hardware, and the inserter 23 and the selector 24 are realized by software.

Figure 16:
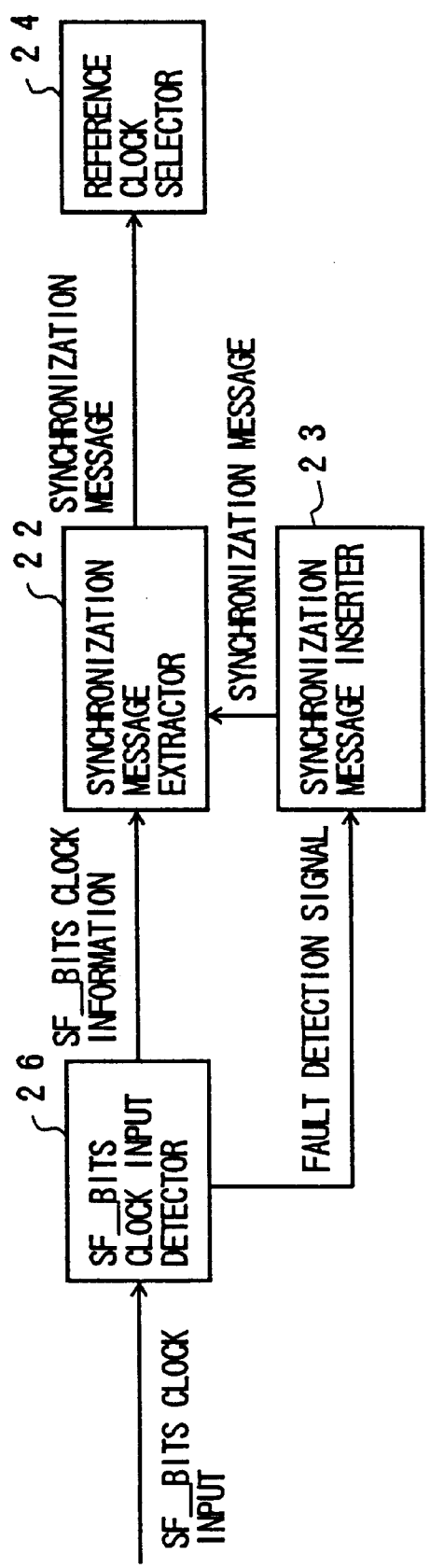
FIG. 16 is a block diagram of a modification of the second embodiment of the present invention.

FIG. 16 is a block diagram of a variation of the second embodiment of the present invention. The aforementioned second embodiment of the present invention employs the given clock quality information which assumes the constant value. Hence, there is a possibility that the above clock quality information may be continuously used even if a fault occurs in the inputting of the SF_BITS clock signal. The variation shown in FIG. 16 is directed to eliminating the above possibility as in the case shown in FIG. 14.

The SF_BITS clock signal detector 26 shown in FIG. 16 detects the SF_BITS clock signal and a fault which occurs therein. For example, the detector 21 detects the following events as faults. For example, an event is detected as a fault in which the SF_BITS clock signal continuously indicates "0" or "1" for a period equal to 175 bits ±75 bits. Another event is detected as a fault in which the SF_BITS clock signal does not have the bit pattern of the super frame (SF) or the extended super frame (ESF).

kbps clock signal, both of which form the composite clock signal, is broken, the detector 21 determines. When such a fault is detected, the detector 26 outputs a fault detection signal to the inserter 23. In response to the fault detection signal, the inserter 23 sends, via the extractor 22, the selector 24 clock quality information which indicates that the corresponding clock signal is inhibited from being used as the reference clock signal. Hence, the selector 24 is inhibited from selecting the SF_BITS clock signal.

The structure shown in FIG. 16 can be realized by a combination of hardware and software, as shown in FIG. 17A or FIG. 17B. In FIG. 17A, the detector 26, the extractor 22 and the inserter 23 are realized by hardware, and the selector 24 is realized by software. In FIG. 17B, the detector 26 and the extractor 22 are realized by hardware, and the inserter 23 and the selector 24 are realized by software.

A description will now be given of a third embodiment of the present invention, which is directed to a case where the transmission device 10A selects the composite clock signal as a clock signal to be output to the ESF_DS1 data link 13A. Originally, the composite clock signal does not have any clock quality information. Hence, the clock information concerning the clock which is sent as the DS1 reference signal is indefinite. Hence, according to the prior art, the transmission device 10B which receives the DS1 reference signal cannot make a decision as to whether the composite clock signal indicated by the DS1 reference signal can be selected as the reference clock signal. The third embodiment of the present invention is directed to avoiding the above situation and sending the synchronization message for the composite clock signal when the DS1 reference signal is output to the ESF_DS1 data link 13A.

Figure 18:
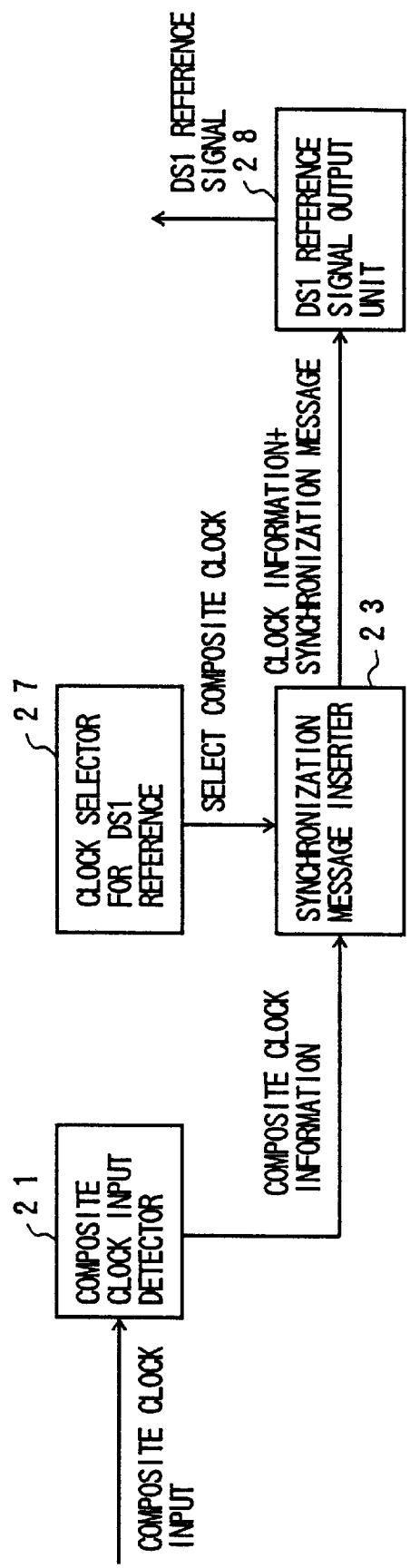
FIG. 18 is a block diagram of a third embodiment of the present invention.

FIG. 18 is a block diagram of the third embodiment of the present invention. The structure shown in FIG. 18 is made up of the composite clock input detector 21, the synchronization message inserter 23, a clock signal selector 27 for the DS1 reference signal, and a DS1 reference signal output part 28. The DS1 reference signal clock selector 27 detects the clock signal having the highest quality from among the extracted clock signals, and notifies the inserter 23 of the detection result. If the selector 27 indicates selection of the composite clock signal, the inserter 23 outputs the corresponding synchronization message (for example, the aforementioned STU) to the DSI1 reference signal output part 28 together with the clock information. The DS1 reference signal output part 28 outputs the clock information of the composite clock signal, and the synchronization message. The DS1 reference signal and the synchronization message are transmitted by using one multiframe of the ESF format shown in FIG. 7. The DS1 reference signal can be transferred using an arbitrary time slot in the one multiframe. The transmission device 10B receives the DS1 reference signal and the synchronization message from the transmission device 10A. Hence, the composite clock signal can be processed as a selectable clock signal. The transmission device 10B which receives the DS1 reference signal from the transmission device 10A also receives the synchronization message so that the composite clock signal can be handled as a selectable clock signal.

The structure shown in FIG. 18 is realized by a combination of hardware and software as shown in FIG. 19A or FIG. 19B. In FIG. 19A, the detector 21, the inserter 23 and the DS1 reference signal output part 28 are realized by hardware, and the DS1 reference clock selector 27 is formed by software. In FIG. 19B, the detector 21 and the output part 28 are realized by hardware, and the inserter 23 and the selector 27 are realized by software.

A description will now be given of a fourth embodiment of the present invention, which is directed to a case where the transmission device 10A selects the SF_BITS clock signal as a clock signal to be output to the ESF_DS1 data link 13A. Originally, the SF_BITS clock signal does not have any clock quality information. Hence, the clock information concerning the clock which is sent as the DS1 reference signal is indefinite. Hence, according to the prior art, the transmission device 10B which receives the DS1 reference signal cannot make a decision as to whether the SF_BITS clock signal indicated by the DS1 reference signal can be selected as the reference clock signal. The fourth embodiment of the present invention is directed to avoiding the above situation and sending the synchronization message for the SF_BITS clock signal when the DS1 reference signal is output to the ESF_DS1 data link 13A.

Figure 20:
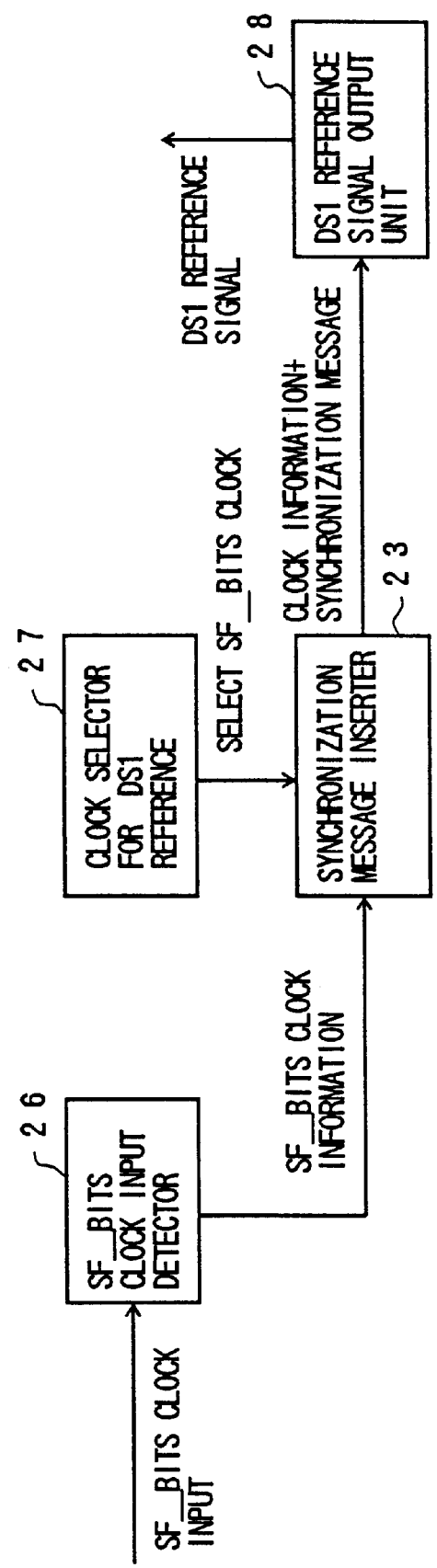
FIG. 20 is a block diagram of a fourth embodiment of the present invention.

FIG. 20 is a block diagram of the fourth embodiment of the present invention. The structure shown in FIG. 20 is made up of the SF_BITS clock input detector 26, the synchronization message inserter 23, the DS1 reference signal clock selector 27, and the DS1 reference signal output part 28. The DS1 reference signal clock selector 27 detects the clock signal having the highest quality from among the extracted clock signals, and notifies the inserter 23 of the detection result. If the selector 27 indicates selection of the SF_BITS clock signal, the inserter 23 outputs the corresponding synchronization message (for example, the aforementioned STU) to the DSI1 reference signal output part 28 together with the clock information. The DS1 reference signal output part 28 outputs the clock information of the SF_BITS clock signal, and the synchronization message. The DS1 reference signal and the synchronization message are transmitted by using one multiframe of the ESF format shown in FIG. 7. The DS1 reference signal can be transferred using an arbitrary time slot in the one multiframe. The transmission device 10B receives the DS1 reference signal and the synchronization message from the transmission device 10A. Hence, the SF_BITS clock signal can be processed as a selectable clock signal. The transmission device 10B which receives the DS1 reference signal from the transmission device 10A also receives the synchronization message so that the SF_BITS clock signal can be handled as a selectable clock signal.

Figure 21A:
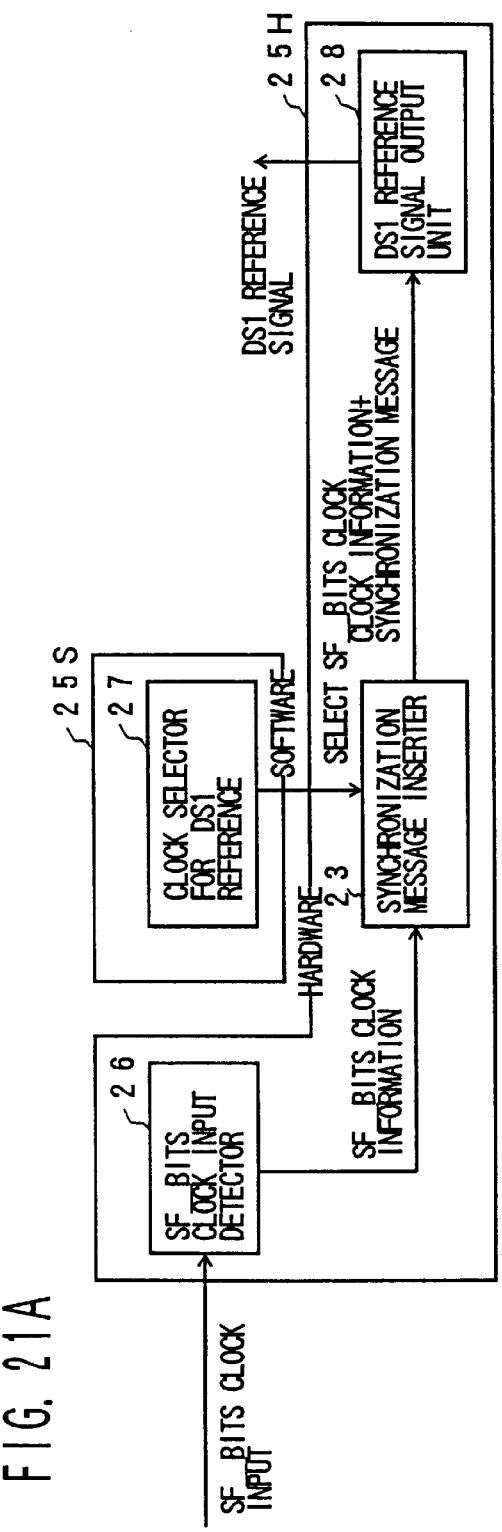
FIG. 21A is a block diagram of a first combination of hardware and software for realizing the fourth embodiment of the present invention.
Figure 21B:
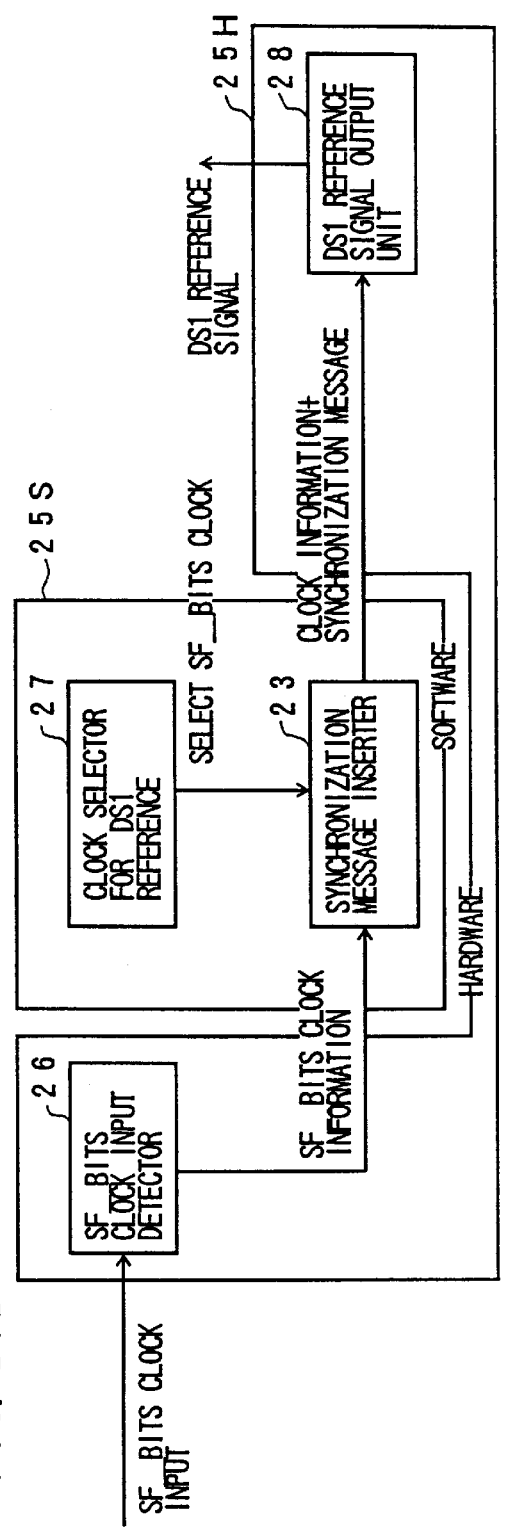
FIG. 21B is a block diagram of a second combination of hardware and software for realizing the fourth embodiment of the present invention.

The structure shown in FIG. 20 is realized by a combination of hardware and software as shown in FIG. 21A or FIG. 21B. In FIG. 21A, the detector 26, the inserter 23 and the DS1 reference signal output part 28 are realized by hardware, and the DS1 reference clock selector 27 is formed by software. In FIG. 21B, the detector 26 and the output part 28 are realized by hardware, and the inserter 23 and the selector 27 are realized by software.

Figure 22:
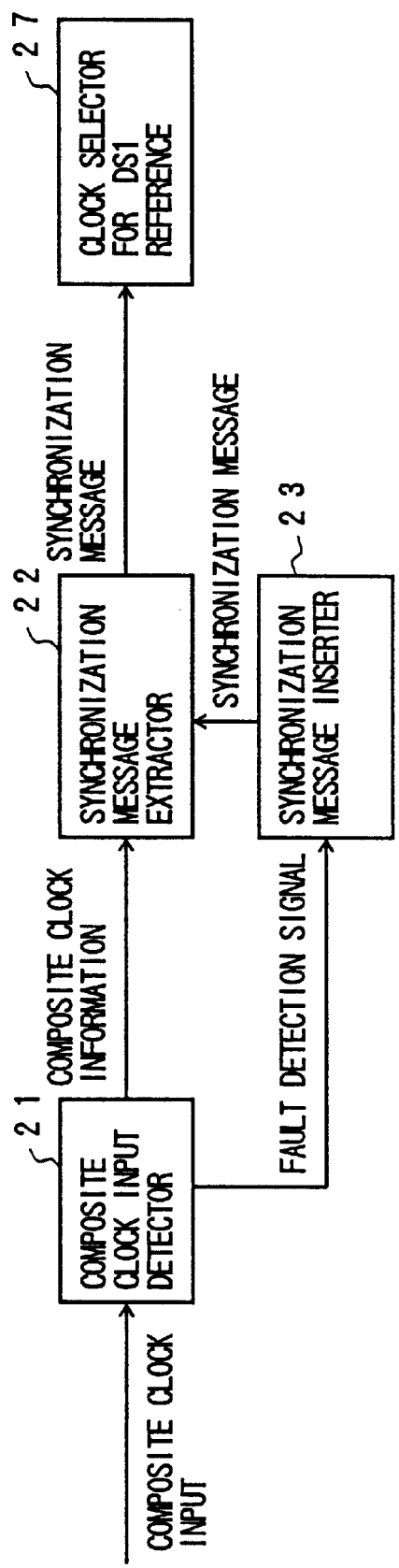
FIG. 22 is a block diagram of a modification of the third embodiment of the present invention.

FIG. 22 is a block diagram of a variation of the third embodiment of the present invention. The variation shown in FIG. 22 includes the composite clock input detector 21, the synchronization message extractor 22 and the synchronization message inserter 23. If a fault which occurs in the composite clock signal is detected by the detector 21, the inserter 23 generates a synchronization message (for example, the aforementioned DUS) which indicates that the composite clock signal cannot be selected. The synchronization message thus generated is output to the DS1 reference signal clock selector 27. Hence, if the composite clock signal has a fault, the synchronization message indicates that the composite clock signal cannot be selected. Hence, the composite clock signal is not selected at the receive side.

Figures 23A, 23B:
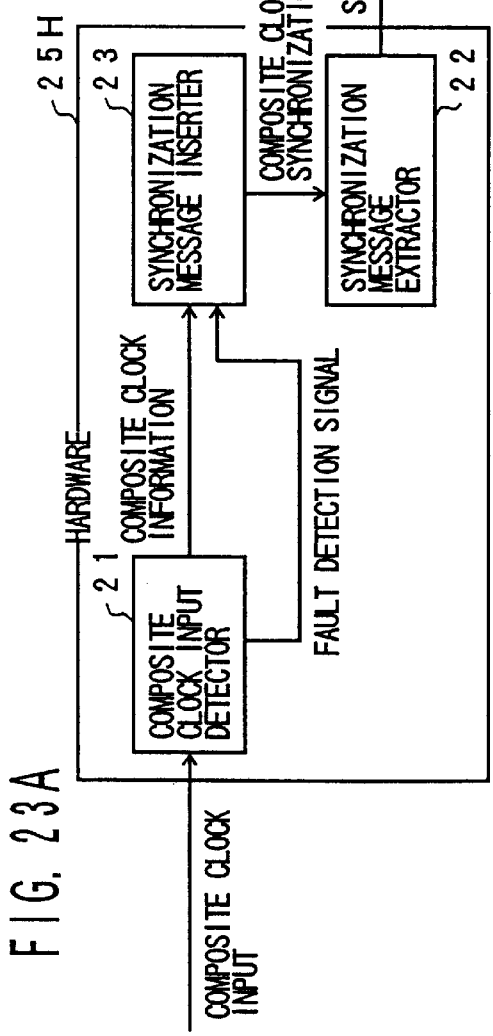
FIG. 23A is a block diagram of a first combination of hardware and software for realizing the modification shown in FIG. 22.
FIG. 23B is a block diagram of a second combination of hardware and software for realizing the modification shown in FIG. 22.

The structure shown in FIG. 22 can be realized by a combination of hardware and software. In FIG. 23A, the detector 21, the extractor 22 and the inserter 23 are formed by hardware, while the selector 27 is formed by software. In FIG. 23B, the detector 21 and the extractor 22 are formed by hardware, while the inserter 23 and the selector 27 are formed by software.

Figure 24:
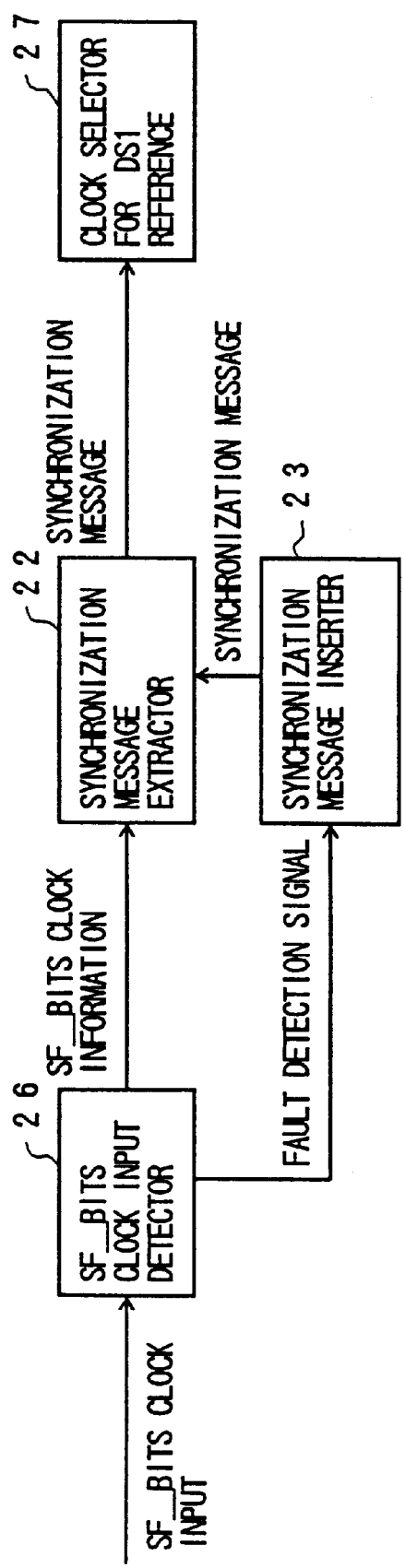
FIG. 24 is a block diagram of a modification of the fourth embodiment of the present invention.

FIG. 24 is a block diagram of a variation of the fourth embodiment of the present invention. The variation shown in FIG. 24 includes the SF_BITS clock input detector 26, the synchronization message extractor 22 and the synchronization message inserter 23. If a fault which occurs in the SF_BITS clock signal is detected by the detector 26, the inserter 23 generates a synchronization message (for example, the aforementioned DUS) which indicates that the SF_BITS clock signal cannot be selected. The synchronization message thus generated is output to the DS1 reference signal clock selector 27. Hence, if the composite clock signal has a fault, the synchronization message indicates that the SF_BITS clock signal cannot be selected. Hence, the composite clock signal is not selected at the receive side.

Figure 25A:
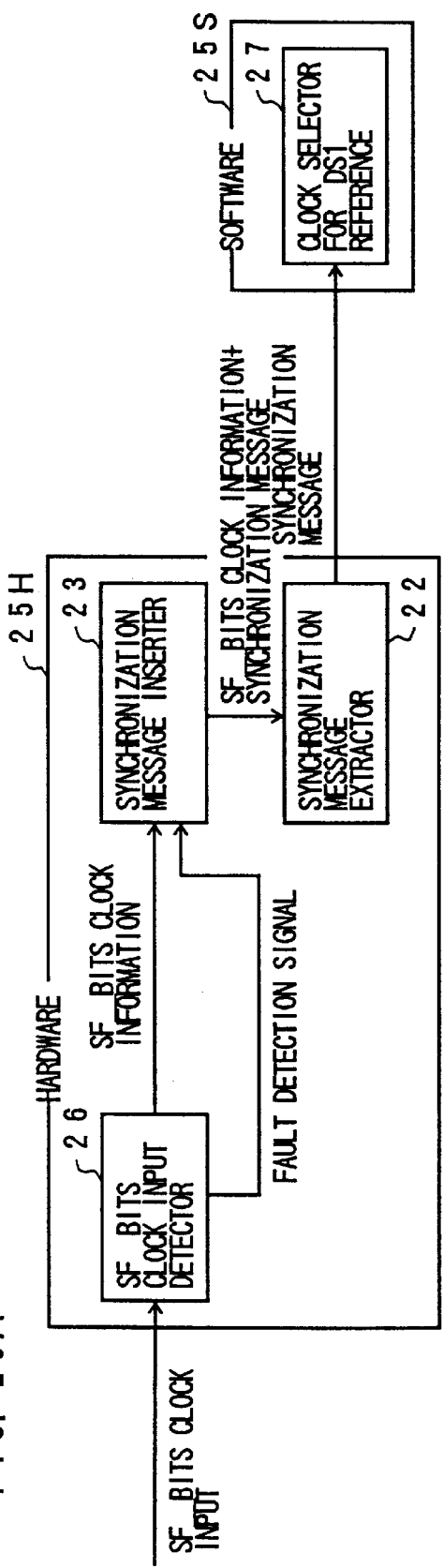
FIG. 25A is a block diagram of a first combination of hardware and software for realizing the modification shown in FIG. 24.
Figure 25B:
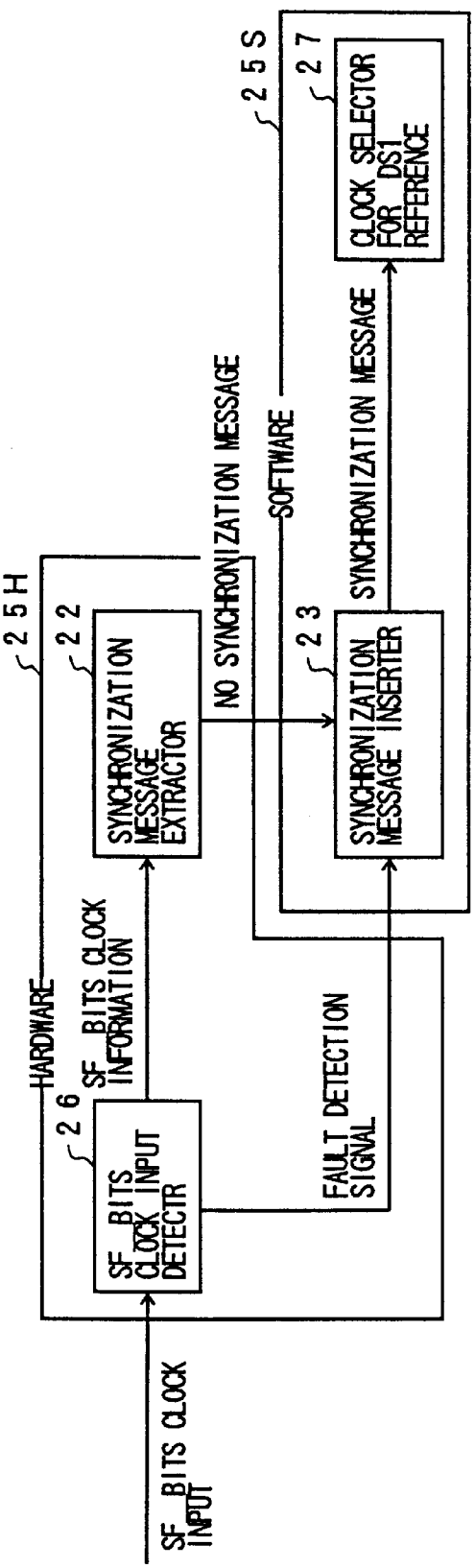
FIG. 25B is a block diagram of a second combination of hardware and software for realizing the modification shown in FIG. 24.

The structure shown in FIG. 24 can be realized by a combination of hardware and software. In FIG. 25A, the detector 26, the extractor 22 and the inserter 23 are formed by hardware, while the selector 27 is formed by software. In FIG. 25B, the detector 26 and the extractor 22 are formed by hardware, while the inserter 23 and the selector 27 are formed by software.

Figure 26:
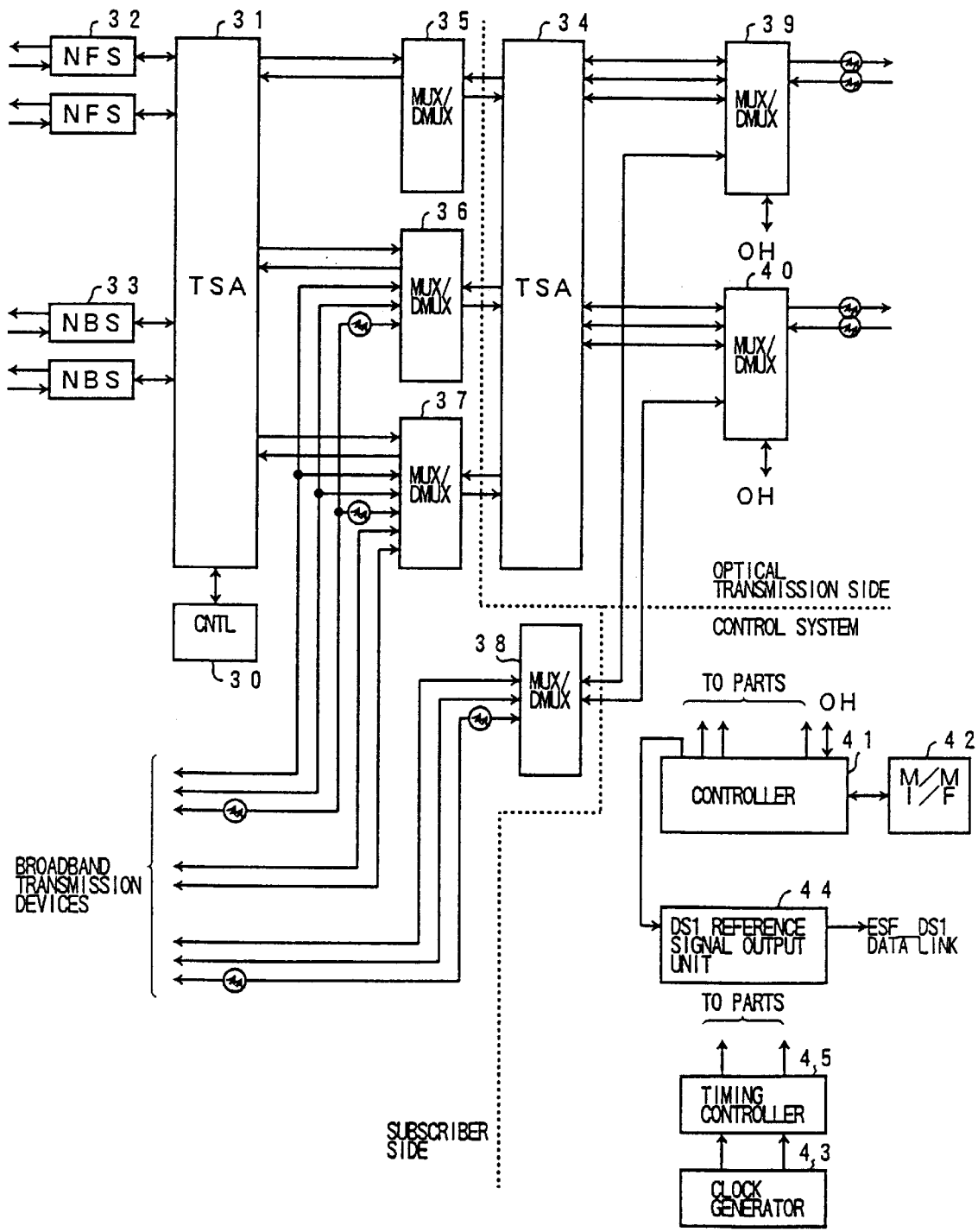
FIG. 26 is a block diagram of a further detailed structure of a transmission device according to the present invention.

The transmission device 10A will be further described with reference to FIG. 26. The transmission device 10E has the same structure as shown in FIG. 26.

The transmission device 10A is mainly made up of a subscriber-side part, an optical-transmission-line side (SONET side) part and a control part. The subscriber-side part provides an interface with a subscriber-side network, and is grouped into a narrowband system and a broadband system. The narrowband system provides narrowband services, and includes a call control processor (CNTL) 30, a time slot assignment unit (TSA) 31, narrowband fiber service shelves (NSF) 32, a narrowband shelves (NBS) 33, and multiplexer/demultiplexer units (MUX/DMUX) 35–37. The broadband system includes multiplexer/demultiplexer units (MUX/DMUX) 36–38.

The narrowband fiber service shelves 32 accommodate optical fiber cables which carry DS-0-level light signals. The narrowband shelves 33 accommodate metallic cables which carry DS-0-level electric signals. The time slot assignment unit 31 carries out a time slot assignment between the shelves 32 and 33 and the multiplexer/demultiplexer units 35–37 under the control of the call control processor 30. The multiplexer/demultiplexer units 35–38 perform signal multiplexing/demultiplexing operations between the time slot assignment unit 31 and the optical transmission side and between broadband transmission devices and the optical transmission side. The broadband transmission devices are connected to the multiplexer/demultiplexer units 36–38 by metallic cables or optical fiber cables.

The structure at the optical transmission side provides an interface between the present transmission device and the SONET, and includes a time slot assignment unit (TSA) 34, and multiplexer/demultiplexer units (MUX/DMUX) 39 and 40. The time slot assignment unit 34 performs a cross-connect operation of the STS-1 level in conformity with the SONET standard. The multiplexer/demultiplexer units 39 and 40 a cross-connect process of the STS-1 level between the time slot assignment unit 34 and the multiplexer/demultiplexer unit 38 and the time slot assignment unit 34 and the optical transmission side.

The control system includes a controller 41, a man/machine interface unit (M/M I/F) 42, a clock generator 43, a DS1 reference signal output unit 44 and a timing controller 45. The clock generator 43 may be provided as an external device. The controller 41 controls the overall transmission device 10A including the time slot assignment unit 34, and includes a CPU, a RAM and a ROM. The man/machine interface unit 42 inputs necessary information to the controller 41 and outputs information from the controller 41 to the operator. The clock generator 43 corresponds to the aforementioned clock generator 11A or 11E, and generates the composite clock signal and/or the SF_BITS clock signal. The DS1 reference signal output unit 44 corresponds to the aforementioned DS1 reference signal output unit 28, and outputs the DS1 reference signal (clock information concerning the selected clock signal) and the synchronization message to the ESF_DS1 data link in accordance with the ESF format. The timing controller 45 receives the line clock signals and the SF_BITS clock signals, and generate a clock signal synchronized with the selected clock signal under the control of the controller 41. The clock signal thus generated is output to the parts 35–40. The timing controller 45 receives the composite clock signal and the SF_BITS clock signal, and can generate therefrom clock signals necessary for the subscriber-side system and the optical transmission side system.

Figure 27:
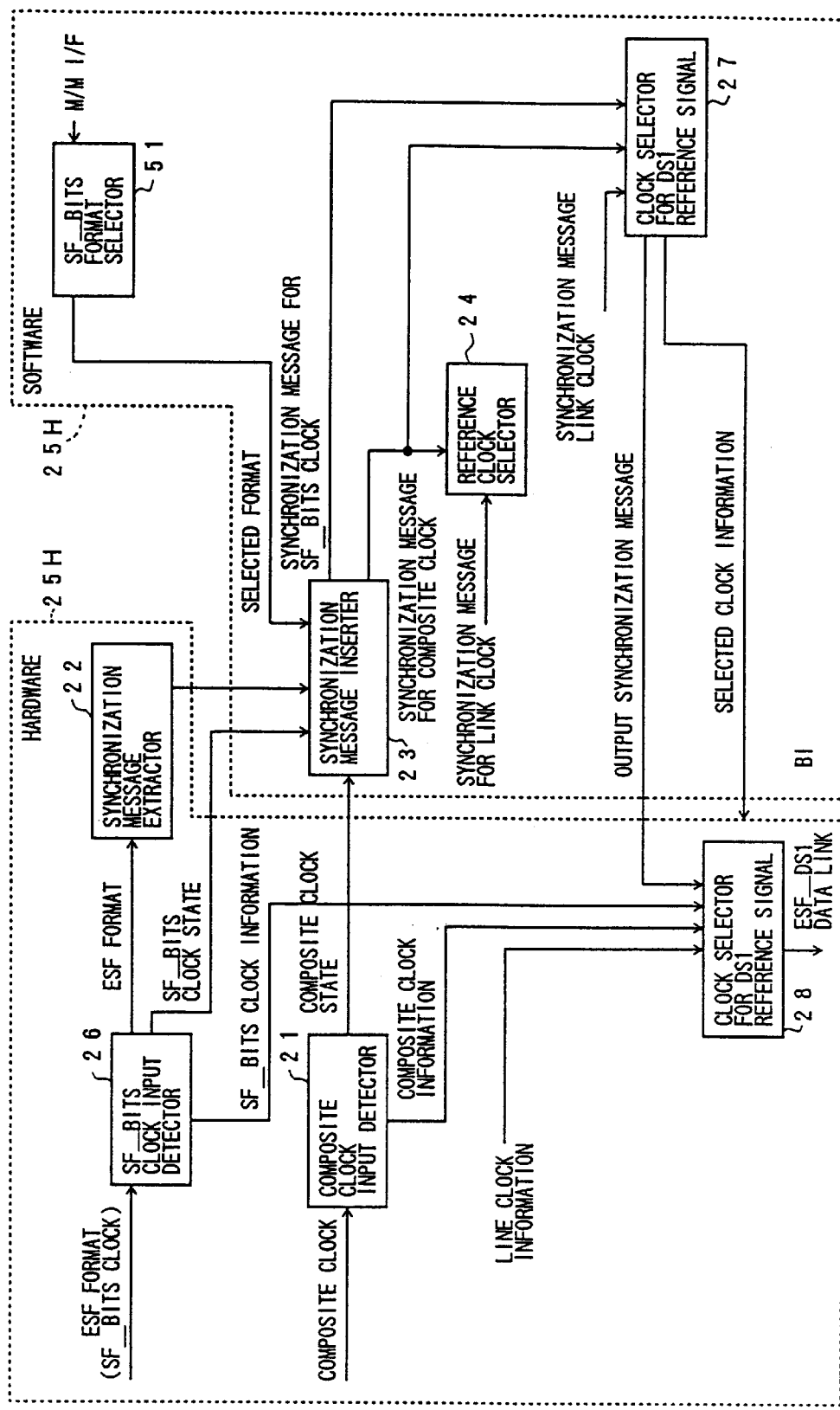
FIG. 27 is a block diagram of a combination of hardware and software for realizing the transmission device shown in FIG. 26.

FIG. 27 is a block diagram of the transmission device which includes the structures as described before. The transmission device has the functions of generating the synchronization messages for the composite clock signal and the SF_BITS clock signals and outputting the signals to the ESF_DS1 data link. The composite clock input detector 21, the synchronization message extractor 22, the SF_BITS clock input detector 26 and the DS1 reference signal output unit 28 are formed by the hardware block 25H. The synchronization message inserter 23, the reference clock selector 24, the DS1 reference clock selector 27 and an SF_BITS format selector 51 are formed by the software block 25S.

The parts of the hardware block 25H corresponds to the parts shown in FIG. 26 as follows. The SF_BITS format selector 51 shown in FIG. 27 corresponds to the man/machine interface part 42. The blocks 21 and 26 shown in FIG. 27 correspond to the timing controller 45 shown in FIG. 26. The DS1 reference signal output part 28 shown in FIG. 27 corresponds to the DS1 reference signal output part 44 shown in FIG. 26. The other parts shown in FIG. 27 correspond to the controller 41 shown in FIG. 26. The software block 25S corresponds to the controller 41 shown in FIG. 26.

The operation of the transmission device shown in FIG. 27 will be described with reference to a flowchart of FIG. 28.

The SF_BITS clock input detector 26 determines whether the SF_BITS clock signal is specified in the ESF format received via the ESF_DS1 data link (in other words, whether or not the SF_BITS clock information is included). If the answer is affirmative, the SF_BITS clock information is set to the DS1 reference signal output unit 28. The SF_BITS clock input detector 26 outputs the fault detection signal to the synchronization message inserter 23, if a fault is detected. The synchronization message extractor 22 extracts the synchronization message inserted in the ESF format sent together with the SF_BITS clock, and transfers it to the synchronization message inserter 23. If the SF_BITS clock signal is one generated by the clock signal generator 43 shown in FIG. 26, the synchronization message extractor 22 extracts nothing.

When the composite clock input detector 21 detects the composite clock input signal, it outputs the composite clock information to the DS1 reference signal output unit 28, and outputs the fault detection signal to the synchronization message inserter 23 if a fault is detected.

The line clock information is related to the line clock extracted from the transmission lines connected to the multiplexer/demultiplexer units 36–40 shown in FIG. 26. When the multiplexer/demultiplexer units 36–40 extract the line clock signals, the units output the line clock information concerning the extracted line clocks to the DS1 reference clock signal output unit 28.

Figure 28:
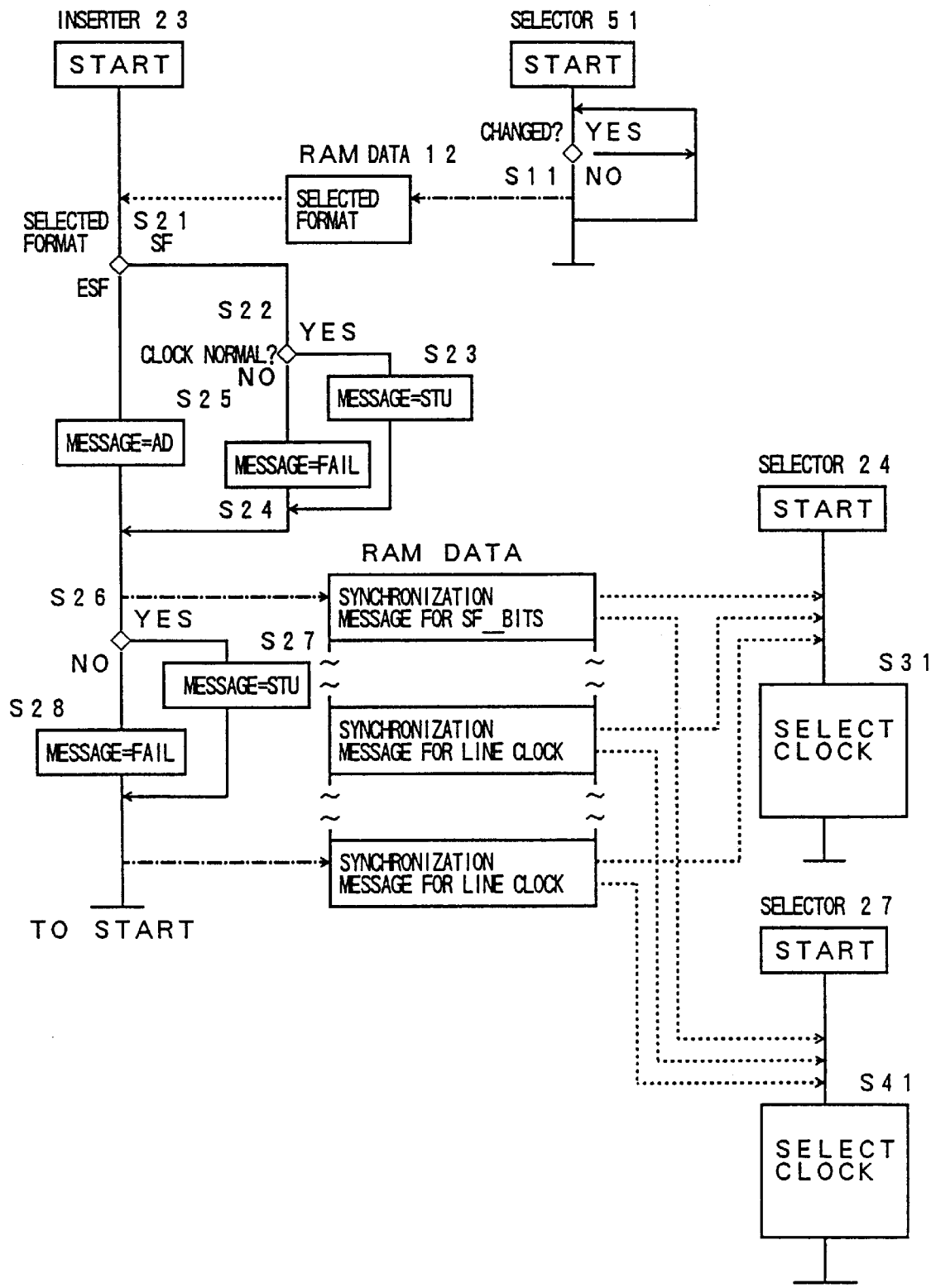
FIG. 28 is a flowchart of operations of software parts of the transmission device shown in FIG. 27.

The software block 25S operates as shown in FIG. 28. At step S11, the SF_BITS format selector 51 determines whether the command input from the man/machine interface unit 42 indicates a change of the DS-1 format. The DS-1 format corresponds to the aforementioned SF format or the ESF format. If the format indicated by the command coincides with the format being currently used, the process shown in FIG. 28 ends. If not, data of the specified format is read from a memory (for example, RAM) in the controller 41 at step S12, and is output to the synchronization message inserter 23.

The synchronization message inserter 23 determines, at step S21, whether the selected format is either the SF format or the ESF format. If the determination result shows that the SF format is selected, the inserter 23 determines, at step S22, whether the SF_BITS clock signal is normal. the inserter 23 is notified of the state of the SF_BITS clock signal from the SF_BITS clock input detector 26, and is stored in the memory in the controller 41. Hence, at step S22, the above memory is accessed. If it is determined that the state of the SF_BITS clock signal is normal, the synchronization message (for example, the aforementioned STU) is generated at step S23. Since the synchronization message is already stored in the memory in the controller 41, the above generating operation corresponds to the read operation in which the message is read from the above memory. The synchronization message for the SF_BITS clock signal is output to the reference clock selector 24 and the DS1 reference clock signal clock selector 27. When it is determined, at step S22, that the SF_BITS clock signal is abnormal, the inserter 23 sets a FAIL flag (having a given value) to the synchronization message for the defective SF_BITS clock signal at step S24, and informs the reference clock signal selector 24 and the DS1 reference signal clock selector 27 of the above setting of the FAIL flag.

When it is determined, at step S21, that the ESF format is selected, the synchronization message inserter 23 supplies the reference clock signal selector 24 and the DS1 reference clock selector 27 with the SF_BITS clock signal synchronization message extracted by the extractor 22 and stored in the memory of the controller 41 at step S25.

At step S26, the synchronization message inserter 23 determines whether the composite clock signal is normal. If the result is YES, the inserter 23 generates the synchronization message (for example STU) for the composite clock signal (in other words, reads it from the memory), and informs the reference clock signal selector 24 and the DS1 reference signal clock selector 27 of the synchronization message at step S27. If the result of step S26 is NO, the inserter 23 sets the FAIL flag (having a given value) to the synchronization message for the defective SF_BITS clock signal at step S27, and informs the reference clock signal selector 24 and the DS1 reference signal clock selector 27 of the above setting of the FAIL flag.

Each of the line clock signals is supported by the respective synchronization messages. A detector similar to the detector 26 and an inserter similar to the inserter 22 are provided to each of the line clock signals. These components are also used in the conventional transmission devices and a description thereof will be omitted here. The synchronization messages for the respective line clock signals are supplied to the controller 41, the reference clock signal selector 27 and the DS1 reference signal clock selector 27.

At step S31, the reference clock selector 24 selects the clock signal having the highest precision by referring to the synchronization messages in accordance with the table shown in FIG. 8. The selected clock signal is used in the transmission device 20A.

At step S41, the DS1 reference signal clock selector 27 selects the clock signal having the highest precision by referring to the synchronization messages in accordance with the table shown in FIG. 8. Then, the selector 27 supplies the DS1 reference signal output unit 28 with the synchronization message for the selected clock signal and the clock information indicative of the clock signal to be selected. The unit 28 selects the clock information concerning the specified clock signal, and outputs the corresponding synchronization message to the ESF_DS1 data link.

The present invention is not limited to the specifically disclosed embodiments, and variations and modifications may be made without departing from the scope of the present invention.

What is claimed is:

1. A transmission device that receives clock signals and also generates clock signals and synchronization messages therefor, comprising:

a first unit which selects one of clock signals received and generated by the transmission device which operates by using said one of the clock signals, wherein some of said clock signals are provided with said synchronization messages and other of said clock signals are not provided with said synchronization messages; and a second unit which is coupled to said first unit and generates, when receiving a clock signal which is not provided with a synchronization message, a new synchronization message for said clock signal so that said first unit selects a clock signal in accordance with a respective synchronization message.

2. The transmission device as claimed in claim 1, further comprising a third unit which determines whether a fault occurs in a clock signal received by the transmission device and prevents the first unit from selecting said received clock signal.

3. The transmission device as claimed in claim 1, further comprising a third unit which transfers a clock signal received by the transmission device and the new synchronization message to another transmission device, which can select said received clock signal by referring to the new synchronization message.

4. The transmission device as claimed in claim 3, further comprising a fourth unit which determines whether a fault occurs in the received clock signal and prevents the first unit from selecting the received clock signal.

5. The transmission device as claimed in claim 1, wherein:

said synchronization messages include information concerning qualities of respective clock signals; and said new synchronization message includes information concerning a quality of the clock signal which was not originally provided with the synchronization message.

6. The transmission device as claimed in claim 1, wherein:

said synchronization messages are defined in the SONET; and the clock signal which was not originally provided with a synchronization message is a clock signal at a DS-0 or DS-1 level.

* * * * *